(12) United States Patent
Lee

(10) Patent No.: US 12,379,607 B2
(45) Date of Patent: Aug. 5, 2025

(54) ACTUATOR FOR CAMERA, AND CAMERA MODULE INCLUDING THE SAME

(71) Applicant: SAMSUNG ELECTRO-MECHANICS CO., LTD., Suwon-si (KR)

(72) Inventor: Kyung Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 132 days.

(21) Appl. No.: 18/477,222

(22) Filed: Sep. 28, 2023

(65) Prior Publication Data
US 2024/0019713 A1 Jan. 18, 2024

Related U.S. Application Data

(63) Continuation of application No. 17/523,361, filed on Nov. 10, 2021, now Pat. No. 11,808,951.

(30) Foreign Application Priority Data

Dec. 11, 2020 (KR) .................. 10-2020-0173708
May 4, 2021 (KR) .................. 10-2021-0058067

(51) Int. Cl.
*G02B 27/64* (2006.01)
*G02B 7/09* (2021.01)
(Continued)

(52) U.S. Cl.
CPC ............ *G02B 27/646* (2013.01); *G02B 7/09* (2013.01); *G03B 5/04* (2013.01); *G03B 13/36* (2013.01);
(Continued)

(58) Field of Classification Search
CPC ........ H04N 23/51; H04N 23/54; H04N 23/55; H04N 23/67; H04N 23/68; H04N 23/682;
(Continued)

(56) References Cited

U.S. PATENT DOCUMENTS

2014/0160311 A1 6/2014 Hwang et al.
2014/0354860 A1 12/2014 Yuge et al.
(Continued)

FOREIGN PATENT DOCUMENTS

CN 101976010 A 2/2011
CN 104219441 A 12/2014
(Continued)

OTHER PUBLICATIONS

Korean Office Action issued on Sep. 21, 2022, in counterpart Korean Patent Application No. 10-2021-0058067 (7 pages in English, 5 pages in Korean).

(Continued)

*Primary Examiner* — Anthony J Daniels
(74) *Attorney, Agent, or Firm* — NSIP Law

(57) ABSTRACT

An actuator for a camera includes a guide member, a base, and a carrier stacked in a housing in an optical axis direction, a first driving unit generating driving force in a first axial direction and a second axial direction, the first driving unit including a plurality of magnets and a plurality of coils, and a second driving unit generating driving force in the optical axis direction and including a magnet and a coil. The carrier, the base, and the guide member are movable together in the first axial direction, the carrier and the base are movable together in the second axial direction, the carrier is movable relative to the base in the optical axis direction, the magnets and the coils of the first driving unit and the magnet and the coil of the second driving unit are disposed to face each other in the optical axis direction.

18 Claims, 30 Drawing Sheets

(51) Int. Cl.
   *G03B 5/04*    (2021.01)
   *G03B 13/36*   (2021.01)
   *H01F 7/06*    (2006.01)
   *H01F 7/08*    (2006.01)
   *H04N 23/54*   (2023.01)
   *H04N 23/68*   (2023.01)

(52) U.S. Cl.
   CPC ............ *H01F 7/064* (2013.01); *H01F 7/081* (2013.01); *H04N 23/54* (2023.01); *H04N 23/687* (2023.01); *G03B 2205/0015* (2013.01); *G03B 2205/0069* (2013.01)

(58) Field of Classification Search
   CPC ...... H04N 23/685; H04N 23/686; G03B 5/00; G03B 2205/00; G02B 27/646
   USPC ............................................. 348/208.99, 374
   See application file for complete search history.

(56) References Cited

U.S. PATENT DOCUMENTS

| | | | |
|---|---|---|---|
| 2014/0362284 A1* | 12/2014 | Shin | G02B 27/646 348/373 |
| 2015/0055220 A1 | 2/2015 | Lim et al. | |
| 2015/0103195 A1 | 4/2015 | Kwon et al. | |
| 2017/0108705 A1 | 4/2017 | Yu et al. | |
| 2018/0046063 A1 | 2/2018 | Sharma | |
| 2018/0109660 A1 | 4/2018 | Yoon et al. | |
| 2019/0271825 A1* | 9/2019 | Kawanabe | G02B 7/02 |
| 2020/0033551 A1 | 1/2020 | Lee et al. | |
| 2020/0363647 A1 | 11/2020 | Noda | |
| 2021/0080806 A1 | 3/2021 | Xuepeng et al. | |
| 2021/0080807 A1 | 3/2021 | Sharma | |
| 2022/0256058 A1* | 8/2022 | Kim | G03B 5/00 |
| 2023/0105581 A1* | 4/2023 | Bachar | G02B 7/08 359/696 |
| 2024/0004265 A1* | 1/2024 | Liu | H04N 23/54 |

FOREIGN PATENT DOCUMENTS

| | | |
|---|---|---|
| CN | 104423118 A | 3/2015 |
| CN | 107734217 A | 2/2018 |
| CN | 207424496 U | 5/2018 |
| CN | 110476119 A | 11/2019 |
| CN | 111948831 A | 11/2020 |
| JP | 2015-84003 A | 4/2015 |
| KR | 10-2015-0042690 A | 4/2015 |
| KR | 10-2016-0121684 A | 10/2016 |
| KR | 10-2017-0045978 A | 4/2017 |
| KR | 10-2018-0116965 A | 10/2018 |
| KR | 10-2018-0135392 A | 12/2018 |
| KR | 10-1960493 B1 | 7/2019 |

OTHER PUBLICATIONS

U.S. Appl. No. 17/523,361, filed Nov. 10, 2021, Lee et al., Samsung Electro-Mechanics Co., Ltd.

Chinese Office Action issued on Mar. 14, 2024, in counterpart Chinese Patent Application No. 202111516723.3 (3 pages in English, 6 pages in Chinese).

* cited by examiner

III-III'

IV-IV'

VI-VI'

VII-VII'

VIII-VIII'

ACTUATOR FOR CAMERA, AND CAMERA MODULE INCLUDING THE SAME

CROSS-REFERENCE TO RELATED APPLICATIONS

This application is a continuation of U.S. patent application Ser. No. 17/523,361 filed on Nov. 10, 2021, which claims the benefit under 35 USC 119(a) of Korean Patent Application Numbers 10-2020-0173708 filed on Dec. 11, 2020, and 10-2021-0058067 filed on May 4, 2021, in the Korean Intellectual Property Office, the entire disclosures of which are incorporated herein by reference for all purposes.

BACKGROUND

1. Field

The following description relates to an actuator for a camera and a camera module including the same.

2. Description of the Background

Camera modules may be employed in mobile communication terminals such as smartphones, tablet PCs, and notebook computers.

In addition, a camera module may be provided with an actuator having a focus adjustment function and an optical image stabilization function in order to generate a high-resolution image.

For example, the focus may be adjusted by moving a lens module in the optical axis (Z-axis) direction, or camera shake may be corrected by moving the lens module in a direction perpendicular to the optical axis (Z-axis).

In the case of actuators, a lens module may be disposed in a carrier, and the focus may be adjusted by moving the carrier and the lens module together in the optical axis (Z-axis) direction. Then, camera shake may be corrected by moving the lens module in the direction perpendicular to the optical axis (Z-axis) in the carrier. In this case, a magnet for optical image stabilization may be mounted on the lens module.

In such actuators, since the lens module is moved in the optical axis (Z-axis) direction during focus adjustment, the relative position (position in the optical axis (Z-axis) direction) of a camera shake compensation magnet and a camera shake compensation coil changes.

When the relative position (position in the optical axis (Z-axis) direction) of the camera shake compensation magnet and the camera shake compensation coil changes, there may be a problem in that it may be difficult to precisely control the driving force (driving force in the direction perpendicular to the optical axis (Z-axis)) by the camera shake compensation magnet and the camera shake compensation coil.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, an actuator for a camera includes a housing having an interior space, a guide member, a base, and a carrier stacked in the housing in an optical axis direction, a first driving unit configured to generate driving force in a first axial direction, perpendicular to the optical axis direction, and in a second axial direction, perpendicular to both the optical axis direction and the first axial direction, the first driving unit including a plurality of magnets and a plurality of coils, and a second driving unit configured to generate driving force in the optical axis direction and including a magnet and a coil. The carrier, the base, and the guide member are configured to be movable together in the first axial direction, the carrier and the base are configured to be movable together in the second axial direction, the carrier is configured to be movable relative to the base in the optical axis direction, the plurality of magnets and the plurality of coils of the first driving unit are disposed to face each other in the optical axis direction, and the magnet and the coil of the second driving unit are disposed to face each other in the optical axis direction.

The first driving unit may include a first sub-driving unit including a first magnet and a first coil facing the first magnet in the optical axis direction, and a second sub-driving unit comprising a second magnet and a second coil facing the second magnet in the optical axis direction. The first magnet may be mounted on the guide member, and the second magnet may be mounted on the base.

The guide member may have a mounting groove in which the first magnet is disposed, and an escape hole accommodating the second magnet.

The housing may have a first substrate mounted thereon. The first coil and the second coil may be disposed on one surface of the first substrate. On an other surface of the first substrate, a first yoke may be disposed in a position facing the first magnet, and a second yoke may be disposed in a position facing the second magnet.

A first ball member capable of rolling motion in the first axial direction may be disposed between the guide member and the housing, and a second ball member capable of rolling motion in the second axial direction may be disposed between the guide member and the base.

At least one of surfaces of the guide member and the housing, facing each other in the optical axis direction, may include a first guide groove in which the first ball member is disposed, and at least one of surfaces of the guide member and the base, facing each other in the optical axis direction, may include a second guide groove in which the second ball member is disposed.

The magnet of the second driving unit may be mounted on the carrier.

The magnet of the second driving unit may include at least two magnets, and the coil of the second driving unit may include at least two coils, the at least two magnets may be disposed on an upper surface and a lower surface of the carrier, respectively, and one coil of the at least two coils may be disposed on the first substrate, and the other coil may be disposed on a second substrate disposed in a position spaced apart from the first substrate in the optical axis direction.

The carrier may include a body portion and a guide portion extending from one side of the body portion in the optical axis direction, the base may include a seating portion facing the body portion in the optical axis direction, and a receiving portion extending from one side of the seating portion in the optical axis direction, and at least a portion of the guide portion is accommodated in an accommodation space in the receiving portion.

A third ball member may be disposed between the guide portion and the receiving portion, and a third guide groove in which the third ball member may be disposed may be respectively disposed in surfaces of the guide portion and the receiving portion facing each other in a direction, perpendicular to the optical axis direction.

The third ball member may include a first ball group in contact with the third guide groove at four points, and a second ball group in contact with the third guide groove at three points.

The number of a plurality of balls belonging to the first ball group may be greater than the number of a plurality of balls belonging to the second ball group.

A first magnetic body may be disposed in the guide portion, a second magnetic body may be disposed in the receiving portion, and attractive force may be generated between the first magnetic body and the second magnetic body in a direction, perpendicular to the optical axis direction. The first magnetic body and the second magnetic body may be disposed closer to the first ball group than the second ball group.

The camera actuator may further include an image sensor disposed on the carrier.

In another general aspect, a camera module includes a housing having an internal space, a lens module fixedly disposed in the internal space, a base and a carrier stacked in an optical axis direction within the housing, a first driving unit configured to generate driving force in a first axial direction, perpendicular to the optical axis direction, and in a second axial direction, perpendicular to both the optical axis direction and the first axial direction, the first driving unit including a plurality of magnets and a plurality of coils, and a second driving unit configured to generate driving force in the optical axis direction and including a magnet and a coil, wherein an image sensor is disposed on the carrier, wherein the carrier and the base are configured to be movable together in the first axial direction and the second axial direction, wherein the carrier is configured to be movable relative to the base in the optical axis direction, wherein the plurality of magnets and the plurality of coils of the first driving unit are disposed to face each other in the optical axis direction, and wherein the magnet and the coil of the second driving unit are disposed to face each other in the optical axis direction.

The first driving unit may include a first sub-driving unit including a first magnet and a first coil facing the first magnet in the optical axis direction, a second sub-driving unit including a second magnet and a second coil facing the second magnet in the optical axis direction, and a first position sensing unit facing the first magnet and the second magnet. The first magnet and the second magnet may be mounted on the base, at least one of the first coil and the second coil may include two coils, and the first position sensing unit may include at least three position sensors.

In another general aspect, an actuator for a camera includes a carrier and a base stacked in a housing in an optical axis direction, a first driving unit configured to drive the base and the carrier in a first direction perpendicular to the optical axis direction, and a second direction perpendicular to the first direction and the optical axis direction, and a second driving unit configured to drive the carrier relative to the base in the optical axis direction, wherein one or more of the first driving unit and the second driving unit comprises a magnet facing a coil in the optical axis direction.

The actuator may further include a guide member, wherein the guide member may be restricted from movement in the second direction, wherein the base is stacked on the guide member, and wherein the first driving unit is configured to drive the guide member, the base, and the carrier in the first direction to drive the base and the carrier in the first direction.

A camera module may include the actuator for a camera, one of an image sensor and a lens barrel disposed on the carrier, and an other of the image sensor and the lens barrel fixedly disposed on the housing, wherein the lens barrel may include one or more lenses disposed on the optical axis, and wherein the image sensor may be configured to receive light emitted from the lens barrel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
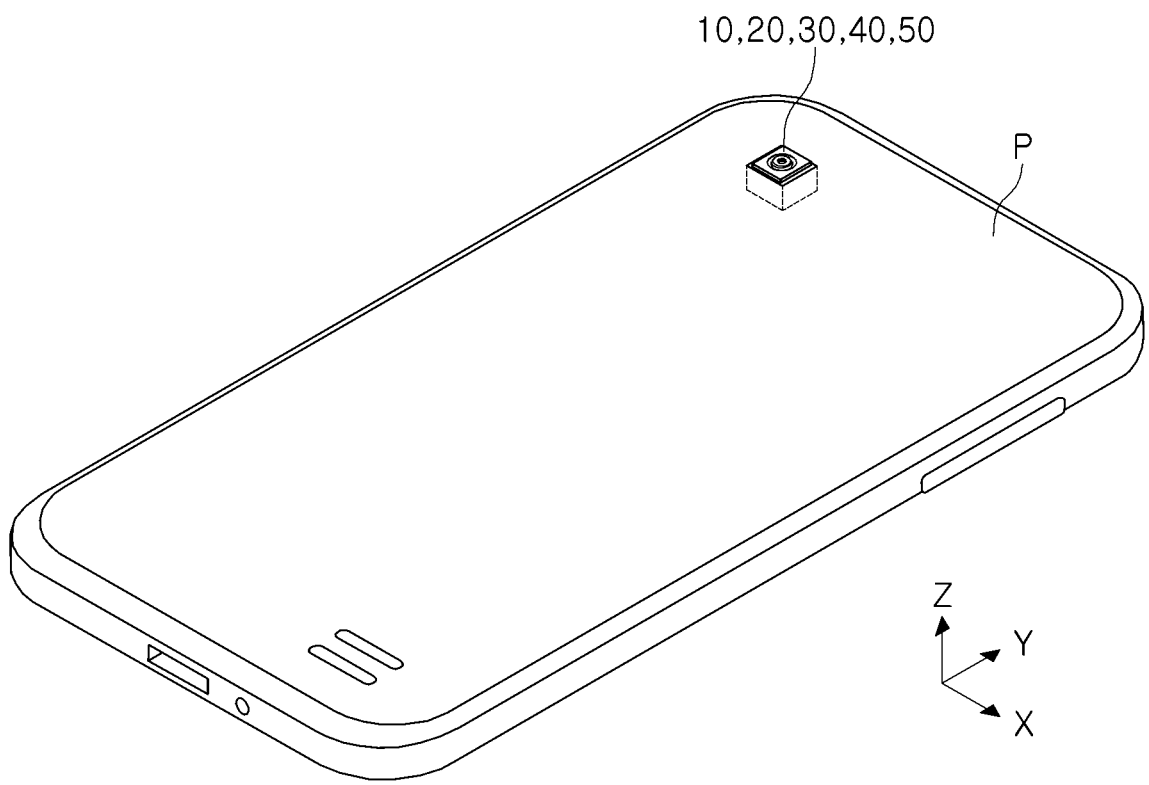
FIG. 1 is a perspective view of a portable electronic device according to an example.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after gaining an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an embodiment or example, for example, as to what an embodiment or example may include or implement, means that at least one embodiment or example exists in which such a feature is included or implemented while all embodiments and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of this disclosure. Further, although the examples described herein have a variety of configurations, other configurations are possible as will be apparent after an understanding of this disclosure.

Examples described herein provide an actuator for a camera in which optical image stabilization may be improved, and a camera module including the same.

FIG. 1 is a perspective view of a portable electronic device according to an example.

Referring to FIG. 1, an actuator for a camera according to examples of the present disclosure, and camera modules 10, 20, 30, 40, and 50 including the same may be mounted on a portable electronic device P. The portable electronic device P may be an electronic device that is portable, such as a mobile communication terminal, a smartphone, or a tablet PC.

Figure 2:
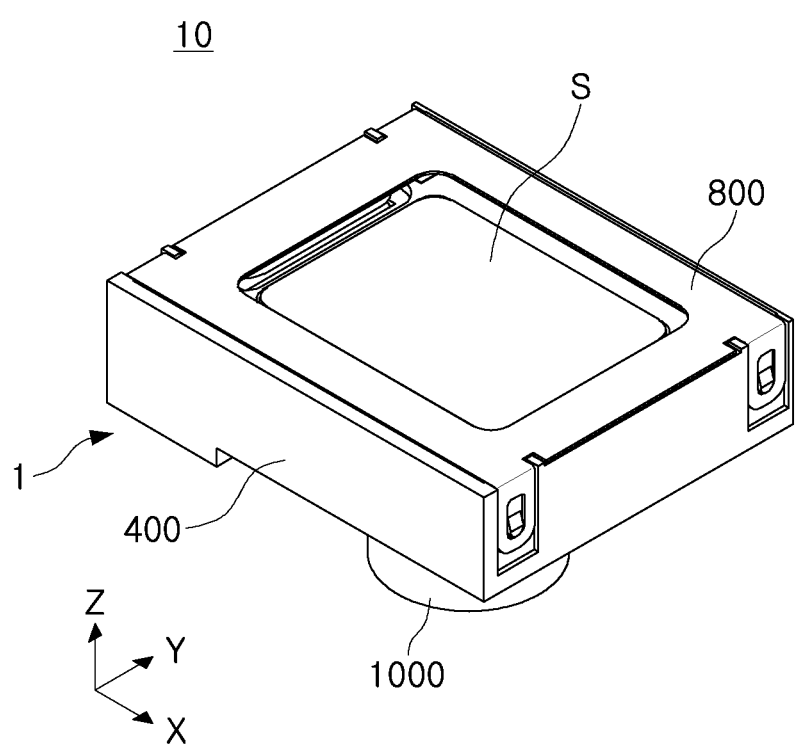
FIG. 2 is a perspective view of a camera module according to an example.
Figure 3:
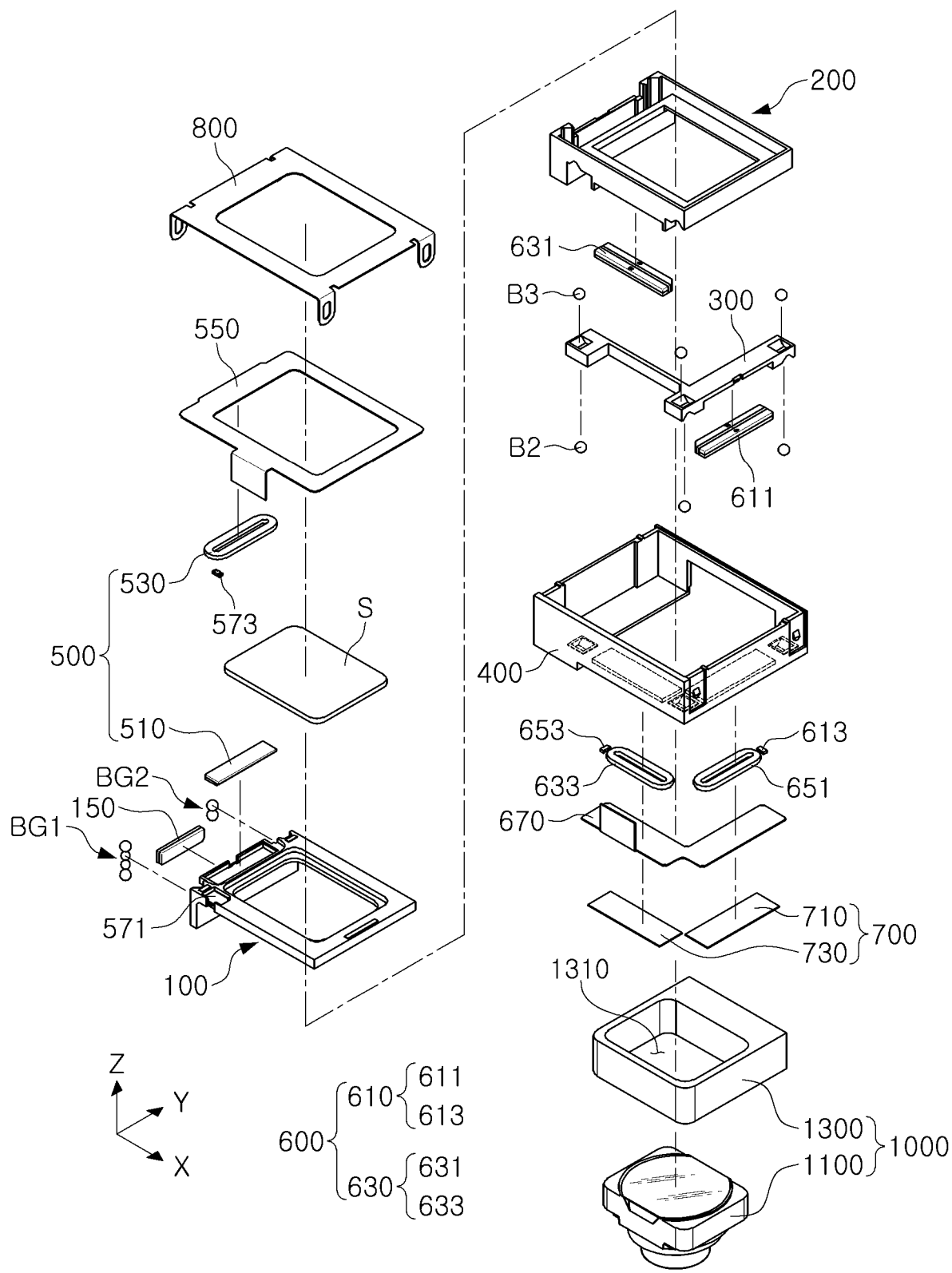
FIG. 3 is a schematic exploded perspective view of a camera module according to an example.

FIG. 2 is a perspective view of a camera module according to an example, and FIG. 3 is a schematic exploded perspective view of a camera module according to an example.

Referring to FIGS. 2 and 3, the camera module 10 according to an example includes a lens module 1000 and an actuator 1 for a camera (hereinafter, referred to as an 'actuator').

The lens module 1000 includes at least one lens L and a lens barrel 1100. At least one lens L is disposed inside the lens barrel 1100. When a plurality of lenses L are provided, the plurality of lenses L are mounted in the lens barrel 1100 along an optical axis (Z-axis).

The lens module 1000 may further include a lens holder 1300 coupled to the lens barrel 1100.

The lens holder 1300 is provided with a coupling hole 1310 penetrating through the lens holder 1300 in the optical axis (Z-axis) direction. The lens barrel 1100 is inserted into the coupling hole 1310 and fixedly disposed in the lens holder 1300. The lens holder 1300 may serve to fix the lens barrel 1100 with respect to a housing 400. In another example, the lens barrel 1100 may also be directly coupled to the housing 400 and fixed.

In an example, the lens module 1000 is a fixing member fixed to the housing 400. For example, the lens module 1000 is a fixed member that does not move during autofocusing (AF) and optical image stabilization (OIS).

The camera module 10 according to an example may perform autofocusing (AF) and optical image stabilization (OIS) by moving an image sensor S instead of the lens module 1000. Since the relatively light image sensor S is moved, the image sensor S may be moved with a smaller amount of driving force. Accordingly, the components constituting the actuator 1 may be downsized.

The actuator 1 includes a carrier 100, a base 200, a guide member 300, and a housing 400.

The carrier 100 may move in the optical axis (Z-axis) direction and in a direction perpendicular to the optical axis (Z-axis). Referring to FIG. 3, the image sensor S is disposed on the carrier 100.

Accordingly, the image sensor S may be moved together with the carrier 100 in the optical axis (Z-axis) direction to adjust the focus, and the image sensor S may be moved together with the carrier 100 in a direction perpendicular to the optical axis (Z-axis) to correct camera shake during shooting.

Referring to FIG. 3, when the lens module 1000 is coupled to the actuator 1, the lens module 1000 may be disposed in a lower side based on FIG. 3. Light is incident from the bottom to the top with reference to FIGS. 2 and 3.

On the other hand, as another example, the lens module 1000 instead of the image sensor (S) may also be disposed in the carrier 100, and the image sensor (S) may be disposed in the housing (400). In this case, autofocusing and optical image stabilization may be performed by moving the lens module 1000 instead of the image sensor S.

The carrier 100 is disposed on the base 200. For example, the carrier 100 may be stacked on the base 200. When adjusting the focus, the base 200 is a fixed member that does not move in the optical axis (Z-axis) direction, and the carrier 100 is a movable member that moves in the optical axis (Z-axis) direction.

A first ball member B1 is disposed between the carrier 100 and the base 200. The first ball member B1 is disposed to contact the carrier 100 and the base 200, respectively.

The first ball member B1 supports the movement of the carrier 100 by rolling in the optical axis (Z-axis) direction when the carrier 100 is moved in the optical axis (Z-axis) direction, relative to the base 200.

The base 200 may be moved in a direction perpendicular to the optical axis (Z-axis). For example, the base 200 is a fixed member that does not move in the optical axis (Z-axis) direction during focus adjustment, but is a movable member that moves in a direction perpendicular to the optical axis (Z-axis) during optical image stabilization.

Since the carrier 100 is disposed on the base 200, the base 200 and the carrier 100 are moved together in a direction perpendicular to the optical axis (Z-axis) to compensate for camera shake.

The base 200 is disposed within the housing 400. The guide member 300 is disposed between the base 200 and the housing 400. For example, the guide member 300 and the base 200 are sequentially disposed in the housing 400 in the optical axis (Z-axis) direction.

The guide member 300 may be configured to be movable in a first axis (X-axis) direction, and the base 200 may be configured to be movable in the first axis (X-axis) direction and a second axis (Y-axis) direction.

For example, the guide member 300 and the base 200 may move together in the first axis (X-axis) direction. In addition, the base 200 may be moved in the second axis (Y-axis) direction relative to the guide member 300.

The first axis (X-axis) direction may indicate a direction perpendicular to the optical axis (Z-axis), and the second axis (Y-axis) direction may indicate a direction perpendicular to both the optical axis (Z-axis) direction and the first axis (X-axis) direction.

A second ball member B2 is disposed between the guide member 300 and the housing 400, and a third ball member B3 is disposed between the guide member 300 and the base 200.

The second ball member B2 is disposed to contact the guide member 300 and the housing 400, respectively, and the third ball member B3 is disposed to contact the guide member 300 and the base 200, respectively.

Figure 4:
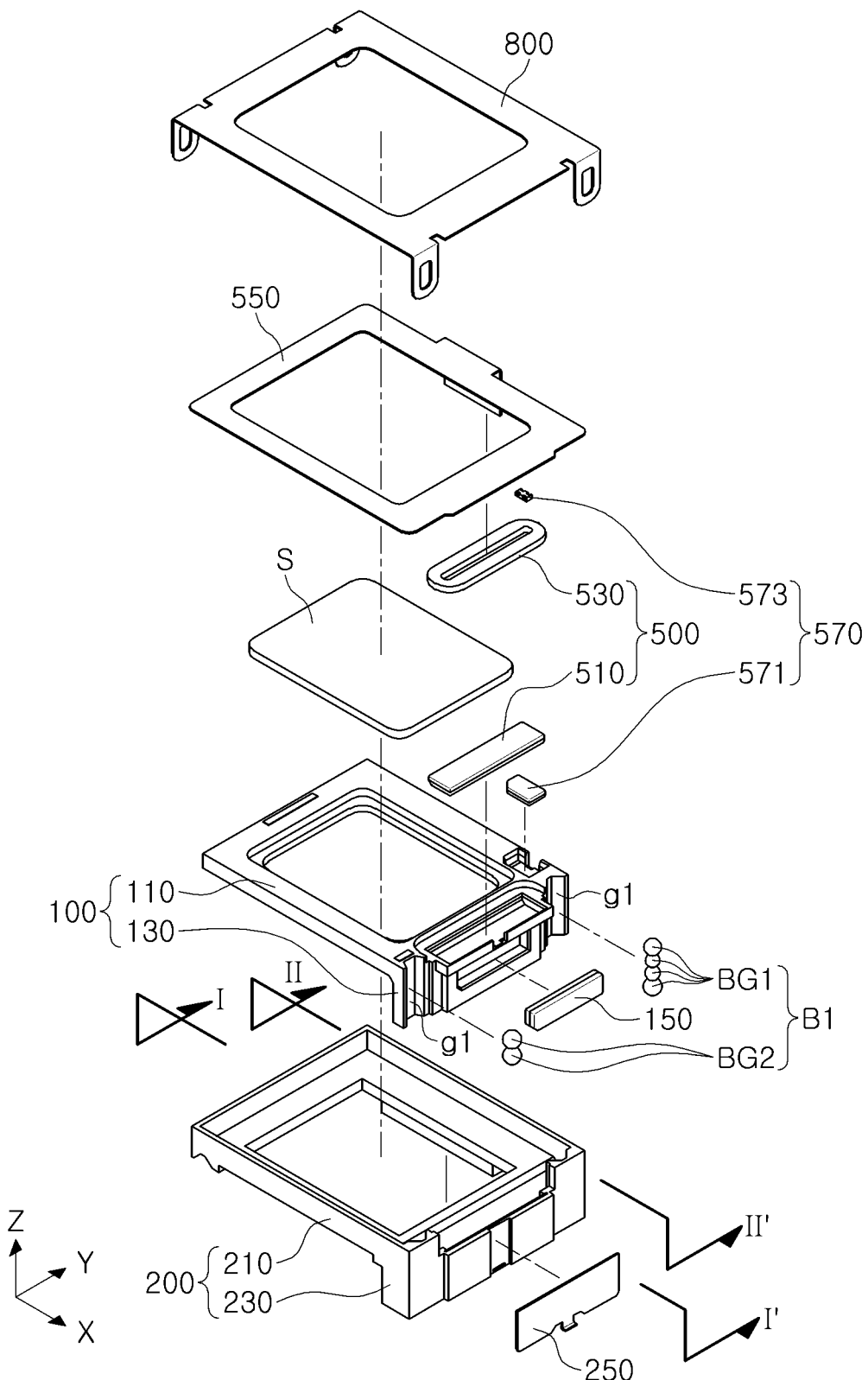
FIG. 4 is an exploded perspective view of a carrier and a base.
Figure 5:
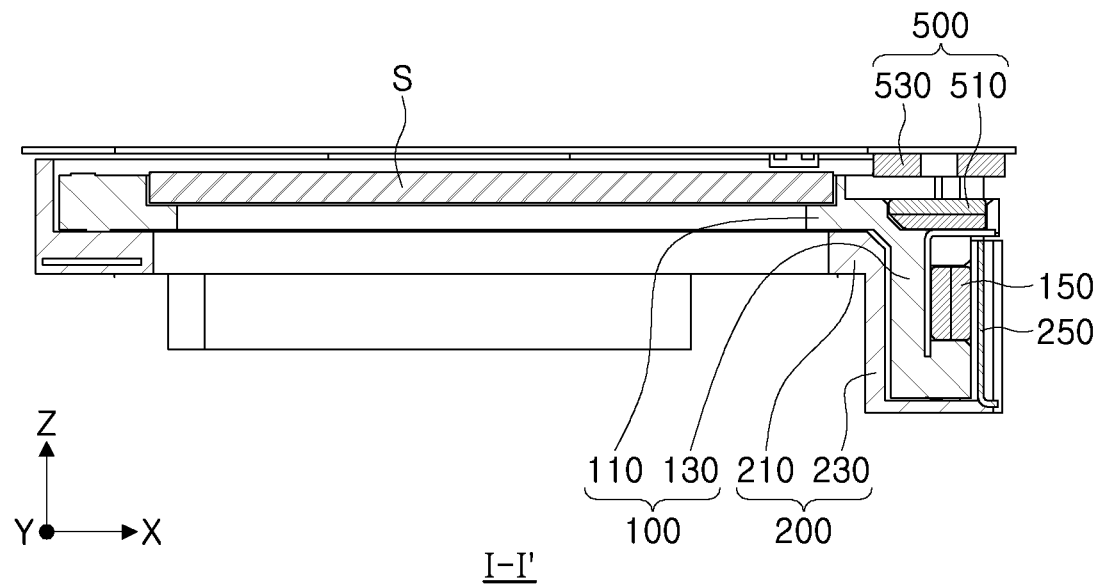
FIG. 5 is a cross-sectional view taken along line I-I' in a state in which the carrier and the base are assembled.
Figure 6:
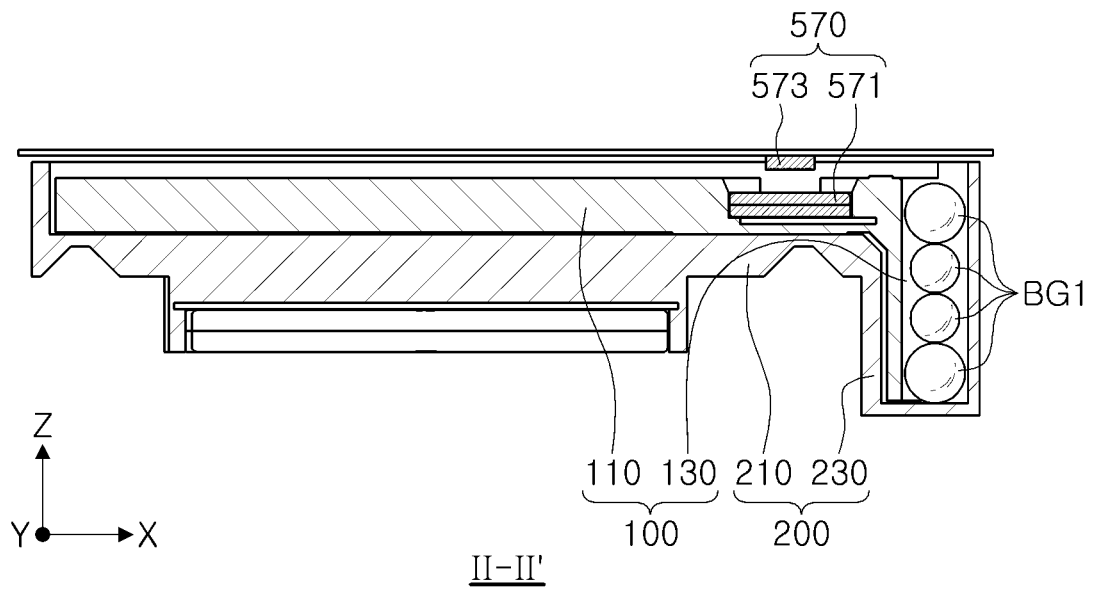
FIG. 6 is a cross-sectional view taken along line II-II' in a state in which the carrier and the base are assembled.

FIG. 4 is an exploded perspective view of the carrier and the base, FIG. 5 is a cross-sectional view taken along line I-I' in an assembled state of the carrier and the base, and FIG. 6 is a cross-sectional view taken along line II-II' in an assembled state of the carrier and the base.

Referring to FIGS. 4 to 6, the movement of the carrier 100 in the optical axis (Z-axis) direction will be described.

The carrier 100 includes a body portion 110 and a guide portion 130. The body portion 110 may have a quadrangular frame shape. The guide portion 130 is disposed on one side of the body portion 110. For example, the guide portion 130 extends in the optical axis (Z-axis) direction from one side of the body portion 110.

The base 200 includes a seating portion 210 and a receiving portion 230. The seating portion 210 may have a quadrangular frame shape. The receiving portion 230 is disposed on one side of the seating portion 210. For example, the receiving portion 230 extends in the optical axis (Z-axis) direction from one side of the seating portion 210.

The body portion 110 of the carrier 100 is disposed on the seating portion 210 of the base 200. The seating portion 210 of the base 200 may serve as a stopper for limiting the movement range of the carrier 100 when the carrier 100 moves downwardly in the optical axis (Z-axis) direction.

A cushioning member having elasticity may be disposed on at least one of the surfaces of the body portion 110 of the carrier 100 and the seating portion 210 of the base 200, facing each other. Therefore, when the carrier 100 and the base 200 collide, impact and noise may be reduced.

The guide portion 130 of the carrier 100 is accommodated in the receiving portion 230 of the base 200. To this end, the receiving portion 230 of the base 200 is provided with an accommodation space in which the guide portion 130 of the carrier 100 may be accommodated.

The guide portion 130 of the carrier 100 and the receiving portion 230 of the base 200 are provided with a first guide groove g1, respectively, and the first ball member B1 is disposed in the first guide groove g1. The first guide groove g1 has a shape that has a length in the optical axis (Z-axis) direction.

The first ball member B1 includes a plurality of balls disposed in the optical axis (Z-axis) direction. The plurality of balls may be rolled in the optical axis (Z-axis) direction when the carrier 100 is moved in the optical axis (Z-axis) direction.

A first magnetic body 150 is disposed on the guide portion 130 of the carrier 100, and a second magnetic body 250 is disposed on the receiving portion 230 of the base 200. When the guide portion 130 of the carrier 100 is disposed in the receiving portion 230 of the base 200, the first magnetic body 150 and the second magnetic body 250 face each other.

The first magnetic body 150 and the second magnetic body 250 may generate attractive force between each other. For example, attractive force may act between the first magnetic body 150 and the second magnetic body 250 in a direction perpendicular to the optical axis (Z-axis).

One of the first magnetic body 150 and the second magnetic body 250 may be a magnet, and the other may be a yoke. In another example, both the first magnetic body 150 and the second magnetic body 250 may be provided as magnets.

The first ball member B1 may be in contact with the carrier 100 and the base 200 by the attractive force of the first magnetic body 150 and the second magnetic body 250.

The first ball member B1 includes a first ball group BG1 and a second ball group BG2, and the first ball group BG1 and the second ball group BG2 respectively include a plurality of balls arranged in the optical axis (Z-axis) direction.

The first ball group BG1 and the second ball group BG2 are spaced apart from each other in a direction perpendicular to the optical axis (Z-axis), for example, in the Y-axis direction. The number of balls of the first ball group BG1 and the number of balls of the second ball group BG2 may be different from each other (please refer to FIG. 4).

For example, the first ball group BG1 includes three or more balls disposed in the optical axis (Z-axis) direction, and the second ball group BG2 includes two or less balls disposed in the optical axis (Z-axis) direction.

In the first ball group BG1, the two balls disposed on the outermost side in the optical axis (Z-axis) direction have the same diameter, and the ball disposed therebetween has a smaller diameter than the ball disposed on the outermost side.

In addition, the two or less balls of the second ball group BG2 have the same diameter as the two balls disposed on the outermost side in the optical axis (Z-axis) direction in the first ball group BG1.

In this case, the same diameter may mean not only physically the same, but may also include manufacturing errors.

Accordingly, the first ball member B1 may be in at least three-point contact with the carrier 100 and the base 200.

The actuator 1 for a camera according to an example includes a first driving unit 500. The first driving unit 500 may generate driving force in the optical axis (Z-axis) direction, to move the carrier 100 in the optical axis (Z-axis) direction.

The first driving unit 500 includes a first magnet 510 and a first coil 530. The first magnet 510 and the first coil 530 may be disposed to face each other in the optical axis (Z-axis) direction.

The first magnet 510 is disposed on the carrier 100. For example, the first magnet 510 may be disposed on the upper surface of the carrier 100. The first magnet 510 may be disposed on the upper surface of the guide portion 130 of the carrier 100. The upper surface of the carrier 100 may mean a surface that faces the cover 800 to be described later.

The first magnet 510 may be a single-pole magnet in which the N pole and the S pole are magnetized in the optical axis (Z-axis) direction. For example, a surface of the first magnet 510, facing the first coil 530, may have an S pole, and an opposite surface may have an N pole. The N pole and the S pole may also be magnetized opposite to each other. A neutral region is formed between the N and S poles.

The first coil 530 is disposed to face the first magnet 510. For example, the first coil 530 may be disposed to face the first magnet 510 in the optical axis (Z-axis) direction.

The first coil 530 is provided on a first substrate 550. The first substrate 550 is mounted on a cover 800 to be described later, such that the first magnet 510 and the first coil 530 face each other in the optical axis (Z-axis) direction.

The first magnet 510 is a moving member mounted on the carrier 100 and moving in the optical axis (Z-axis) direction together with the carrier 100, and the first coil 530 is a fixed member fixed to the first substrate 550 and the cover 800.

When power is applied to the first coil 530, the carrier 100 may be moved in the optical axis (Z-axis) direction by the electromagnetic influence between the first magnet 510 and the first coil 530.

Since the image sensor S is disposed on the carrier 100, the image sensor S is also moved in the optical axis (Z-axis) direction by the movement of the carrier 100.

The actuator 1 for a camera according to an example may sense the position of the carrier 100 in the optical axis (Z-axis) direction.

To this end, a first position sensing unit 570 is provided. The first position sensing unit 570 includes a sensing magnet 571 and a first position sensor 573. The sensing magnet 571 is disposed on the upper surface of the carrier 100, and the first position sensor 573 is disposed on the first substrate 550 to face the sensing magnet 571. The first position sensor 573 may be a Hall sensor.

In the example illustrated in FIG. 4, the first position sensing unit 570 includes the sensing magnet 571 and the first position sensor 573, but without disposing a separate sensing magnet 571, the first position sensor 573 may also be disposed to face the first magnet 510.

Figure 7:
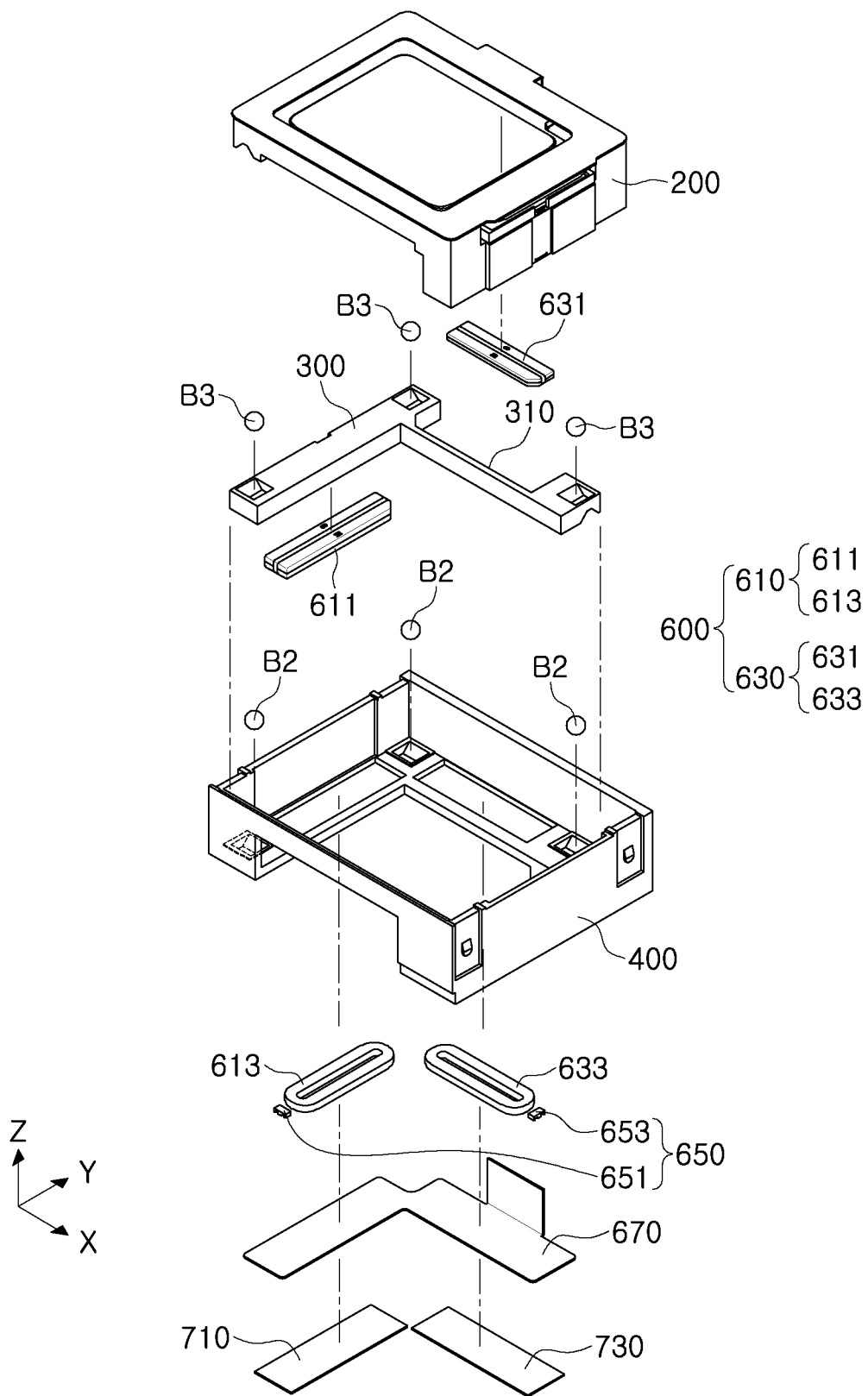
FIG. 7 is an exploded perspective view of a base, a guide member, and a housing.
Figure 8:
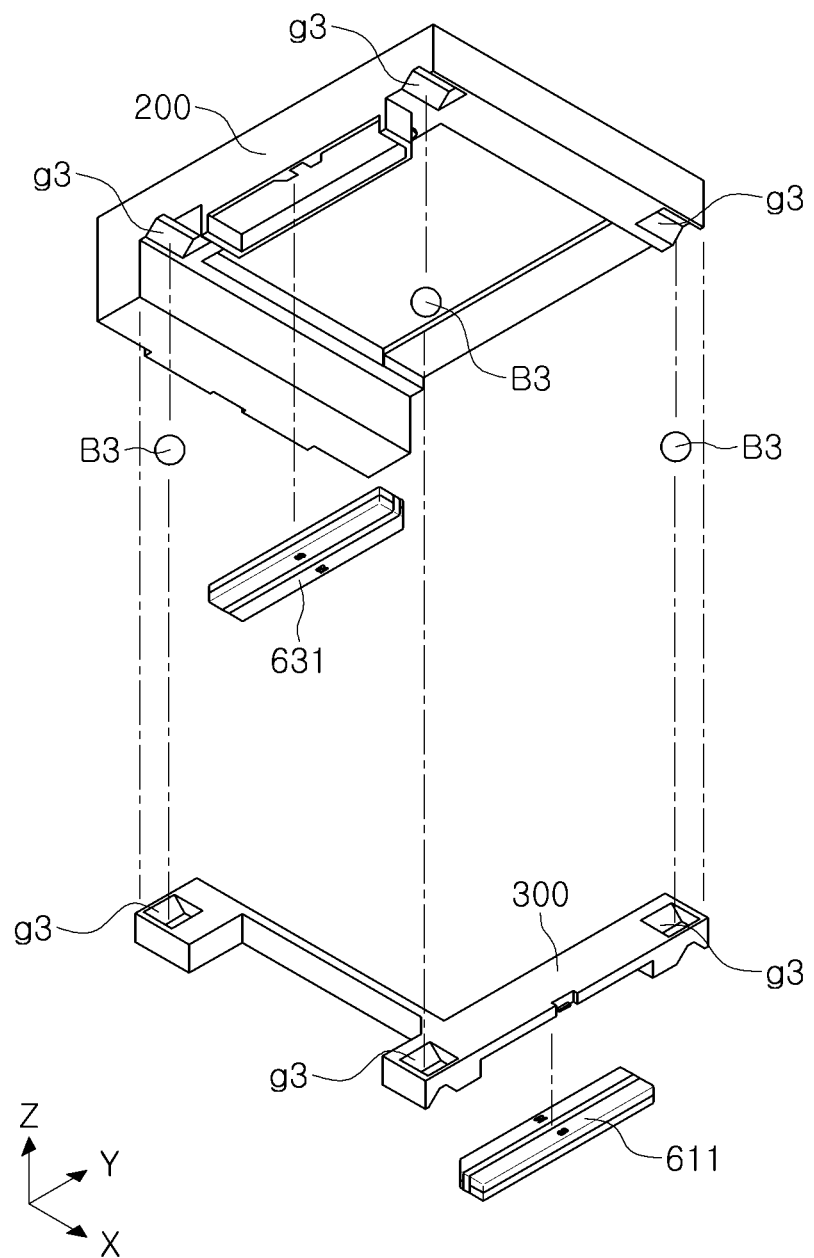
FIG. 8 is a bottom perspective view of a base and a perspective view of a guide member.
Figure 9:
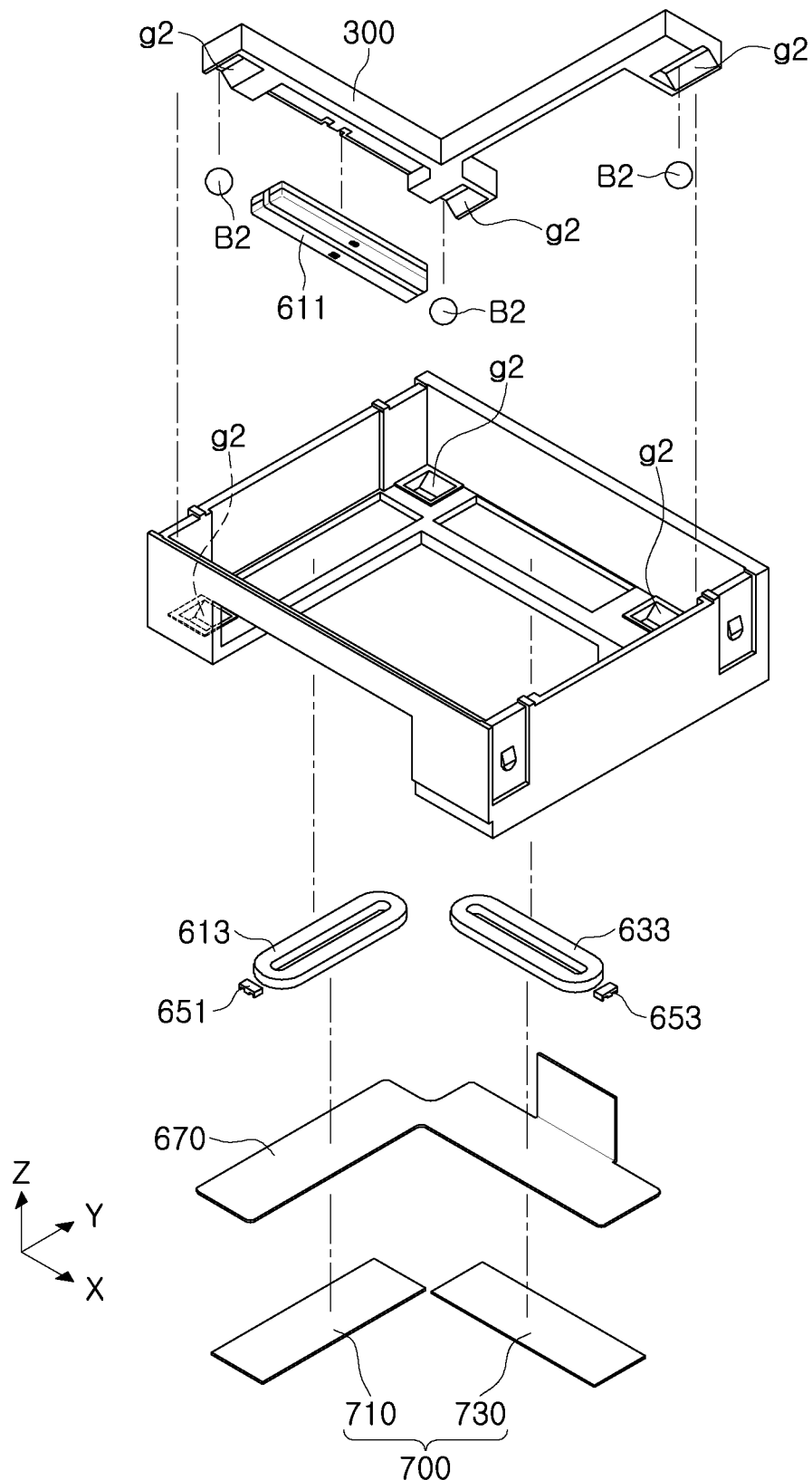
FIG. 9 is a bottom perspective view of the guide member and a perspective view of the housing.

FIG. 7 is an exploded perspective view of the cover, the base, the guide member and the housing, FIG. 8 is a bottom perspective view of the base and a perspective view of the guide member, and FIG. 9 is a bottom perspective view of the guide member and a perspective view of the housing.

The movement of the base 200 and the guide member 300 in a direction perpendicular to the optical axis (Z-axis) will be described with reference to FIGS. 7 to 9.

The guide member 300 and the base 200 are disposed in the housing 400. For example, the guide member 300 and the base 200 are sequentially disposed in the housing 400 in the optical axis (Z-axis) direction. Accordingly, the guide member 300 is disposed between the lower surface of the base 200 and the bottom surface of the housing 400.

When viewed in the optical axis (Z-axis) direction, the guide member 300 may have a shape in which two sides of a quadrangle are removed. For example, the guide member 300 may have an ']' or '[' shape when viewed in the optical axis (Z-axis) direction.

Since the guide member 300 is disposed between the base 200 and the housing 400, it is necessary to reduce the thickness of the guide member 300 to reduce the height of the actuator 1 in the optical axis (Z-axis) direction.

However, in a case in which the thickness of the guide member 300 is reduced, the rigidity of the guide member 300 may be weakened, thereby reducing resistance to external shocks.

Accordingly, the guide member 300 may be provided with a reinforcing plate to reinforce the rigidity of the guide member 300.

For example, the reinforcing plate may be integrally coupled to the guide member 300 by insert injection. In this case, the reinforcing plate may be manufactured to be integrated with the guide member 300 by injecting a resin material into the mold while the reinforcing plate is fixed in the mold.

The reinforcing plate is disposed inside the guide member 300, and a portion of the reinforcing plate is exposed to the outside of the guide member 300. In this manner, while the reinforcing plate is integrally formed inside the guide member 300, by exposing a portion of the reinforcing plate to the outside of the guide member 300, the bonding force between the reinforcing plate and the guide member 300 may be improved, and the reinforcing plate may be prevented from being separated from the frame.

The reinforcing plate may be formed of a non-magnetic metal such that the reinforcing plate does not affect the magnetic fields of a second magnet 611 and a third magnet 631 of a second driving unit 600 to be described later.

The guide member 300 may be configured to be movable in the first axis (X-axis) direction, and the base 200 may be configured to be movable in the first axis (X-axis) direction and the second axis (Y-axis) direction.

For example, the guide member 300 and the base 200 may be moved together in the first axis (X-axis) direction. In addition, the base 200 may be moved in the second axis (Y-axis) direction relative to the guide member 300.

Since the carrier 100 is disposed on the base 200 and the image sensor S is disposed on the carrier 100, as a result, the base 200 moves in the first axis (X-axis) direction and the second axis (Y-axis) direction, and thus, the carrier 100 and the image sensor S may also be moved in the first axis (X-axis) direction and the second axis (Y-axis) direction.

The actuator 1 according to an example includes the second driving unit 600. The second driving unit 600 may generate driving force in a direction perpendicular to the optical axis (Z-axis) to move the base 200 in a direction perpendicular to the optical axis (Z-axis).

The second driving unit 600 includes a first sub-driving unit 610 and a second sub-driving unit 630. The first sub-driving unit 610 may generate driving force in the first axis (X-axis) direction, and the second sub-driving unit 630 may generate driving force in the second axis (Y-axis) direction.

The first sub-driving unit 610 includes a second magnet 611 and a second coil 613. The second magnet 611 and the second coil 613 may be disposed to face each other in the optical axis (Z-axis) direction.

The second magnet 611 is disposed on the guide member 300. For example, the second magnet 611 may be disposed on the lower surface of the guide member 300. The lower surface of the guide member 300 may mean a surface facing the bottom surface of the housing 400.

A surface of the second magnet 611 facing the second coil 613 may have both an N pole and an S pole. For example, the surface of the second magnet 611 facing the second coil 613 may have an N pole, a neutral region, and an S pole sequentially provided in the first axis (X-axis) direction. The second magnet 611 has a shape that has a length in the second axis (Y-axis) direction.

The second coil 613 is disposed to face the second magnet 611. For example, the second coil 613 may be disposed to face the second magnet 611 in the optical axis (Z-axis) direction. The second coil 613 also has a shape having a length in the second axis (Y-axis) direction.

The second coil 613 is provided on a second substrate 670. The second substrate 670 is mounted on the bottom surface of the housing 400 such that the second magnet 611 and the second coil 613 face each other in the optical axis (Z-axis) direction.

The second magnet 611 is a movable member that is mounted on the guide member 300 and moves together with the guide member 300, and the second coil 613 is a fixed member fixed to the second substrate 670, for example, the housing 400.

When power is applied to the second coil 613, the guide member 300 may be moved in the first axis (X-axis) direction by the electromagnetic influence between the second magnet 611 and the second coil 613.

The second sub-driving unit 630 includes a third magnet 631 and a third coil 633. The third magnet 631 and the third coil 633 may be disposed to face each other in the optical axis (Z-axis) direction.

The third magnet 631 is disposed on the base 200. For example, the third magnet 631 may be disposed on the lower surface of the base 200. The lower surface of the base 200 may mean a surface facing the bottom surface of the housing 400.

An escape groove 310 is provided in the guide member 300 in such a manner that the third magnet 631 and the second coil 613 may directly face each other. The guide member 300 and the base 200 are sequentially disposed in the housing 400 in the optical axis (Z-axis) direction, and even when the third magnet 631 is disposed on the base 200 by the escape groove 310 provided in the guide member 300, the overall height of the actuator 1 may be prevented from increasing.

A surface of the third magnet 631 facing the third coil 633 may have both an N pole and an S pole. For example, the surface of the third magnet 631 facing the third coil 633 may have an N pole, a neutral region, and an S pole sequentially provided in the second axis (Y-axis) direction. The third magnet 631 has a shape having a length in the first axis (X-axis) direction.

The third coil 633 is disposed to face the third magnet 631. For example, the third coil 633 may be disposed to face the third magnet 631 in the optical axis (Z-axis) direction. The third coil 633 also has a shape having a length in the first axis (X-axis) direction.

The third coil 633 is provided on the second substrate 670. The second substrate 670 is mounted on the bottom surface of the housing 400 such that the third magnet 631 and the third coil 633 face each other in the optical axis (Z-axis) direction.

The third magnet 631 is a movable member mounted on the base 200 and moves together with the base 200, and the third coil 633 may be a fixing member fixed to the second substrate 670 (the housing 400).

When power is applied to the third coil 633, the base 200 may be moved in the second axis (Y-axis) direction by electromagnetic influence between the third magnet 631 and the third coil 633.

In this example, the second magnet 611 is mounted on the guide member 300, and the third magnet 631 is mounted on the base 200, but in another example, both the second magnet 611 and the third magnet 631 may also be mounted on the base 200.

As illustrated in FIG. 7, the second coil 613 and the third coil 633 may be provided as winding coils and mounted on the second substrate 670. In another example, the second coil 613 and the third coil 633 may be a copper foil pattern stacked and embedded in the second substrate 670.

The second magnet 611 and the third magnet 631 are disposed perpendicular to each other in a plane perpendicular to the optical axis (Z-axis), and the second coil 613 and the third coil 633 are also located perpendicular to each other in a plane perpendicular to the optical axis (Z-axis).

The second ball member B2 is disposed between the guide member 300 and the housing 400, and the third ball member B3 is disposed between the guide member 300 and the base 200.

The second ball member B2 is disposed to contact the guide member 300 and the housing 400, respectively, and the third ball member B3 is disposed to contact the guide member 300 and the base 200, respectively.

The second ball member B2 and the third ball member B3 function to guide the movement of the guide member 300 and the base 200 during the process of optical image stabilization, and in addition, also function to maintain a gap between the base 200, the guide member 300 and the housing 400.

The second ball member B2 guides the movement of the guide member 300 in the first axis (X-axis) direction, and the third ball member B3 guides the movement of the base 200 in the second axis (Y-axis) direction.

For example, when the driving force in the first axis (X-axis) direction is generated, the second ball member B2 rolls in the first axis (X-axis) direction. Accordingly, the second ball member B2 guides the movement of the guide member 300 in the first axis (X-axis) direction.

In addition, when the driving force in the second axis (Y-axis) direction is generated, the third ball member B3 rolls in the second axis (Y-axis) direction. Accordingly, the third ball member B3 guides the movement of the base 200 in the second axis (Y-axis) direction.

The second ball member B2 includes a plurality of balls disposed between the guide member 300 and the housing 400, and the third ball member B3 is disposed between the base 200 and the guide member 300.

A second guide groove g2 in which the second ball member B2 is disposed is formed in at least one of the surfaces of the guide member 300 and the housing 400 facing each other in the optical axis (Z-axis) direction. The second guide groove g2 is provided as a plurality of second guide grooves g2 to correspond to the plurality of balls of the second ball member B2.

The second ball member B2 is disposed in the second guide groove g2 and fitted between the guide member 300 and the housing 400.

In the state in which the second ball member B2 is accommodated in the second guide groove g2, the second ball member B2 is limited in movement in the optical axis (Z-axis) and the second axis (Y-axis) directions, and may only move in the first axis (X-axis) direction. As an example, the second ball member B2 is capable of rolling motion only in the first axis (X-axis) direction.

To this end, the planar shape of the second guide groove g2 may be a rectangle having a length in the first axis (X-axis) direction.

A third guide groove g3 in which the third ball member B3 is disposed is formed in at least one of the surfaces of the base 200 and the guide member 300 facing each other in the optical axis (Z-axis) direction. The third guide groove g3 is provided as a plurality of third guide grooves g3 to correspond to the plurality of balls of the third ball member B3.

The third ball member B3 is accommodated in the third guide groove g3 and is fitted between the base 200 and the guide member 300.

In the state in which the third ball member B3 is accommodated in the third guide groove g3, the third ball member B3 is limited in movement in the optical axis (Z-axis) and the first axis (X-axis) direction, and may only move in the second axis (Y-axis) direction. As an example, the third ball member B3 is capable of rolling motion only in the second axis (Y-axis) direction.

To this end, the planar shape of the third guide groove g3 may be a rectangle having a length in the second axis (Y-axis) direction.

When the driving force is generated in the first axis (X-axis) direction, the guide member 300 and the base 200 are moved together in the first axis (X-axis) direction.

In this case, the second ball member B2 disposed between the guide member 300 and the housing 400 rolls along the first axis (X-axis).

The third ball member B3 is disposed between the guide member 300 and the base 200, and the third ball member B3 is limited in movement in the first axis (X-axis) direction, and as a result, as the guide member 300 moves in the first axis (X-axis) direction, the base 200 also moves in the first axis (X-axis) direction.

In addition, when the driving force is generated in the second axis (Y-axis) direction, the base 200 moves in the second axis (Y-axis) direction.

At this time, the third ball member B3 disposed between the base 200 and the guide member 300 rolls along the second axis (Y-axis).

The guide member 300 may move in the first axis (X-axis) direction, and the base 200 may move in both the first axis (X-axis) direction and the second axis (Y-axis) direction.

Since the carrier 100 is disposed on the base 200 and the image sensor S is disposed on the carrier 100, as a result, as the base 200 moves, the carrier 100 and the image sensor S also move in the first axis (X-axis) direction and the second axis (Y-axis) direction.

As described above, the carrier 100 may be moved in the optical axis (Z-axis) direction relative to the base 200.

The image sensor S is electrically connected to the first substrate 550 or the second substrate 670. For example, the image sensor S may be electrically connected to the first substrate 550 or the second substrate 670 by a connection portion.

Since the image sensor S is movable in three axial directions, the connection portion connecting the image sensor S and the first substrate 550 or the second substrate 670 to each other may be configured to be flexible.

For example, the connection portion may be provided in the form of a flexible film in which a conductor is patterned or in the form of a plurality of cables. Accordingly, when the image sensor S is moved, the connection portion may be bent.

The actuator 1 according to an example may sense a position of the base 200 in a direction perpendicular to the optical axis (Z-axis).

To this end, a second position sensing unit 650 is provided. The second position sensing unit 650 includes a second position sensor 651 and a third position sensor 653. The second position sensor 651 is disposed on the second substrate 670 to face the second magnet 611, and the third position sensor 653 is disposed on the second substrate 670 to face the third magnet 631. The second position sensor 651 and the third position sensor 653 may be Hall sensors.

In the example illustrated in FIG. 7, the second position sensor 651 is disposed to face the second magnet 611 without disposing a separate sensing magnet, and the third position sensor 653 is disposed to face the third magnet 631. However, like the first position sensing unit 570, the second position sensing unit 650 may also be configured to further include a sensing magnet.

In an example, a yoke portion 700 is provided such that the base 200, the guide member 300, and the housing 400 may be maintained in a state of contact with the second ball member B2 and the third ball member B3.

The yoke portion 700 includes a first yoke 710 and a second yoke 730, and the first yoke 710 and the second yoke 730 are fixed to the housing 400. For example, the first yoke 710 and the second yoke 730 may be disposed on the second substrate 670, and the second substrate 670 may be fixed to the housing 400.

The first yoke 710 is disposed to face the second magnet 611 in the optical axis (Z-axis) direction, and the second yoke 730 is disposed to face the third magnet 631 in the optical axis (Z-axis) direction.

Accordingly, attractive force acts between the first yoke 710 and the second magnet 611 and between the second yoke 730 and the third magnet 631 in the optical axis (Z-axis) direction, respectively.

Therefore, since the base 200 and the guide member 300 are pressed in the direction toward the yoke portion 700, a contact state of the base 200, the guide member 300 and the housing 400 with the second ball member B2 and the third ball member B3 may be maintained.

The first yoke 710 and the second yoke 730 may be formed of a material capable of generating attractive force between the second magnet 611 and the third magnet 631, respectively. For example, the first yoke 710 and the second yoke 730 are provided as a magnetic body.

Even when attractive force acts between the yoke portion 700 and the second magnet 611 and the third magnet 631, the contact state between the respective components may be released due to an external impact or the like. Therefore, in an example of the present disclosure, the cover 800 is provided to improve resistance to external shocks or the like.

The cover 800 is coupled to the housing 400 to cover at least a portion of the upper surface of the carrier 100. The cover 800 may be hook-coupled to the housing 400.

Accordingly, the cover 800 may serve as a stopper to prevent the carrier 100 from being separated to the outside. The cushioning member having elasticity may be disposed on at least one of the surfaces of the cover 800 and the carrier 100 facing each other. Therefore, in a case in which the cover 800 and the carrier 100 collide, impact and noise may be reduced.

In addition, the cover 800 may cover the upper surface of the guide portion 130 of the carrier 100 to prevent the first ball member B1 from being separated.

In the actuator 1 according to an example, the first coil 530 of the first driving unit 500, and the second coil 613 and the third coil 633 of the second driving unit 600 are all fixed members.

When even some coils are moved during autofocusing and/or optical image stabilization, there may be a problem in that the connection between the coil and the substrate may become complicated.

However, in the case of the actuator 1 according to an example of the present disclosure, since all of the first coil 530, the second coil 613, and the third coil 633 do not move during autofocusing and optical image stabilization, the connection between each coil and the board may be simplified.

In addition, even in the case in which the carrier 100 is moved in the optical axis (Z-axis) direction during focus adjustment, since the relative positions of the second magnet 611 and the second coil 613 and the relative positions of the third magnet 631 and the third coil 633 do not change, the driving force for optical image stabilization may be precisely controlled.

Figure 10:
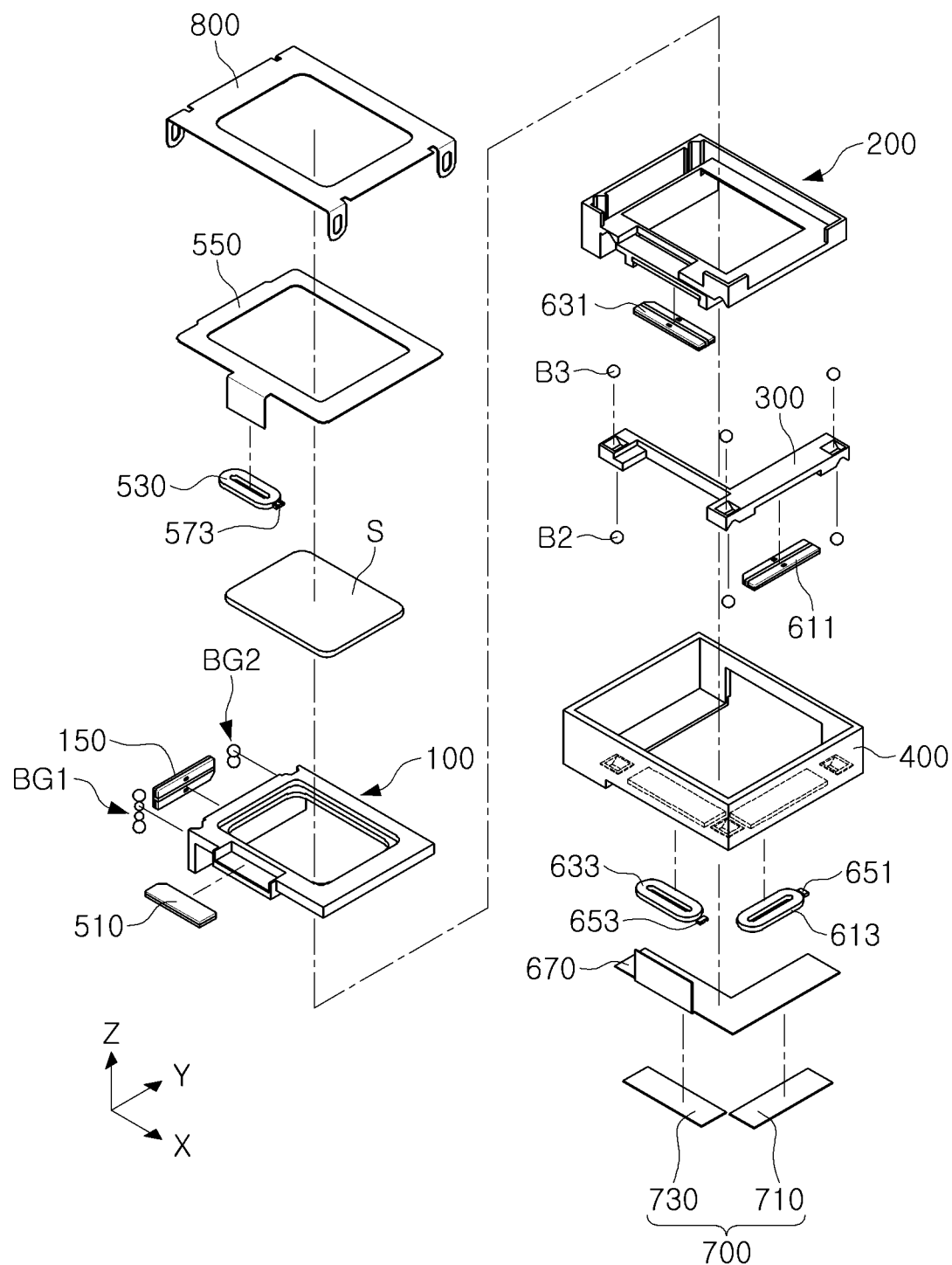
FIG. 10 is a schematic exploded perspective view of an actuator for a camera according to another example.

FIG. 10 is a schematic exploded perspective view of an actuator for a camera according to another example.

The example illustrated in FIG. 10 is different from the example illustrated in FIG. 3 in the positions of the first magnet 510 and the first coil 530.

Referring to FIG. 10, the first magnet 510 is disposed on the carrier 100. For example, the first magnet 510 may be disposed on the upper surface of the carrier 100. Unlike the example illustrated in FIG. 3, the first magnet 510 may be disposed on a remaining surface of the upper surface of the carrier 100, except for the guide portion 130.

For example, the position of the first magnet 510 may be anywhere on the upper surface of the carrier 100.

Since the first magnet 510 may be disposed anywhere on the upper surface of the carrier 100, at least a portion of the first magnet 510 may be disposed to overlap the second magnet 611 or the third magnet 631 in the optical axis (Z-axis) direction depending on the position of the first magnet 510.

In the example illustrated in FIG. 10, the first magnet 510 is disposed at a position overlapping with the third magnet 631 in the optical axis (Z-axis) direction.

In this case, since the magnetic field of the first magnet 510 may affect the third coil 633 or the magnetic field of the third magnet 631 may affect the first coil 530, a yoke may be disposed between the first magnet 510 and the third magnet 631. The yoke may be disposed on the lower surface of the carrier 100 or the upper surface of the base 200. The yoke may be formed of a magnetic metal material.

Figure 11:
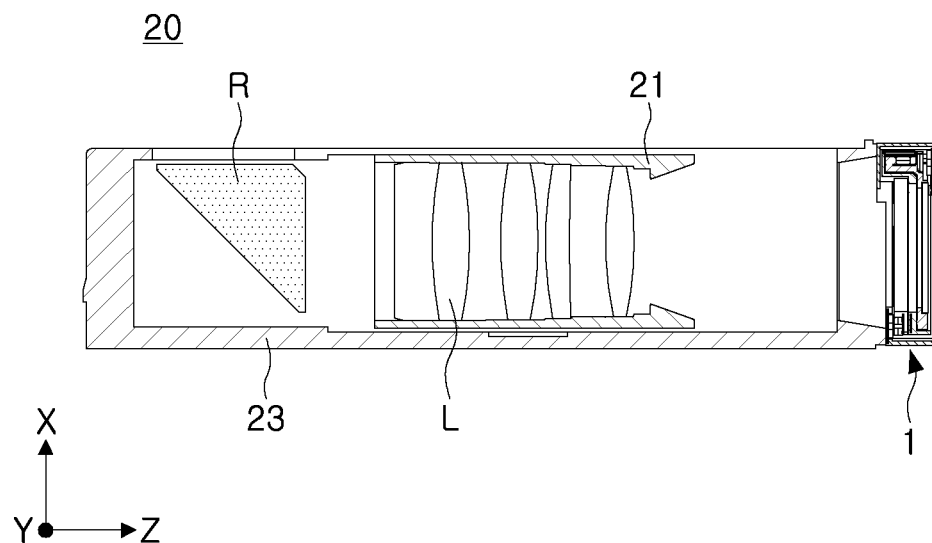
FIG. 11 is a schematic cross-sectional view of a camera module according to another example.
Figure 12:
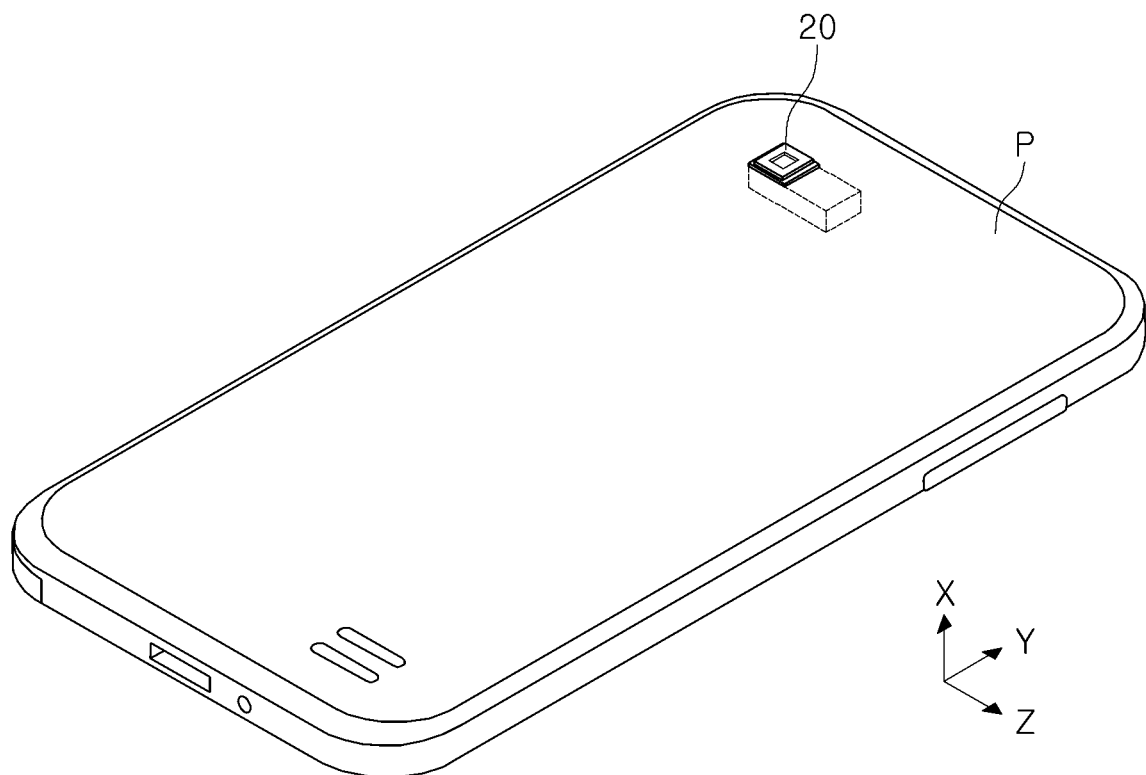
FIG. 12 is a perspective view of a portable electronic device according to another example.

FIG. 11 is a schematic cross-sectional view of a camera module according to another example, and FIG. 12 is a perspective view of a portable electronic device P according to another example.

Referring to FIGS. 11 and 12, a camera module 20 according to another example includes a case 23, a reflective member R, a lens module 21, and an actuator 1.

In this example, the optical axis (Z-axis) of the lens module 21 may be in a direction perpendicular to the thickness direction (X-axis direction, the direction from the front surface to the rear surface of the portable electronic device (P), or vice versa) of the portable electronic device (P).

For example, the optical axis (Z-axis) of the lens module 21 may be formed in the width direction or the length direction of the portable electronic device P.

When the components constituting the camera module are stacked in the thickness direction of the portable electronic device P, there is a problem in that the thickness of the portable electronic device P increases.

However, in the camera module 20 of this example, since the optical axis (Z-axis) of the lens module 21 is formed in the width direction or the length direction of the portable electronic device P, the thickness of the portable electronic device P may be reduced.

The reflective member R and the lens module 21 are disposed inside the case 23. The case 23 has an internal space to accommodate the reflective member R and the lens module 21. However, a structure in which the reflective member R and the lens module 21 are disposed in separate cases 23 respectively and respective cases 23 are coupled to each other may also be provided.

The reflective member R is configured to change the traveling direction of light. For example, the traveling direction of the light incident into the case 23 may be changed to be directed toward the lens module 21 through the reflective member R. The reflective member R may be a mirror or a prism that reflects light.

The actuator 1 is coupled to the case 23. The actuator 1 may be the actuator 1 described with reference to FIGS. 2 to 10.

The actuator 1 is equipped with the image sensor S, and the image sensor S may be moved in the optical axis (Z-axis) direction, the first axis (X-axis) direction and the second axis (Y-axis) direction by the first driving unit 500 and the second driving unit 600.

Since the image sensor S mounted on the actuator 1 may be moved in the optical axis (Z-axis) direction, the first axis (X-axis) direction and the second axis (Y-axis) direction, the focus adjustment and optical image stabilization functions may be performed by the movement of the image sensor S.

Figure 13:
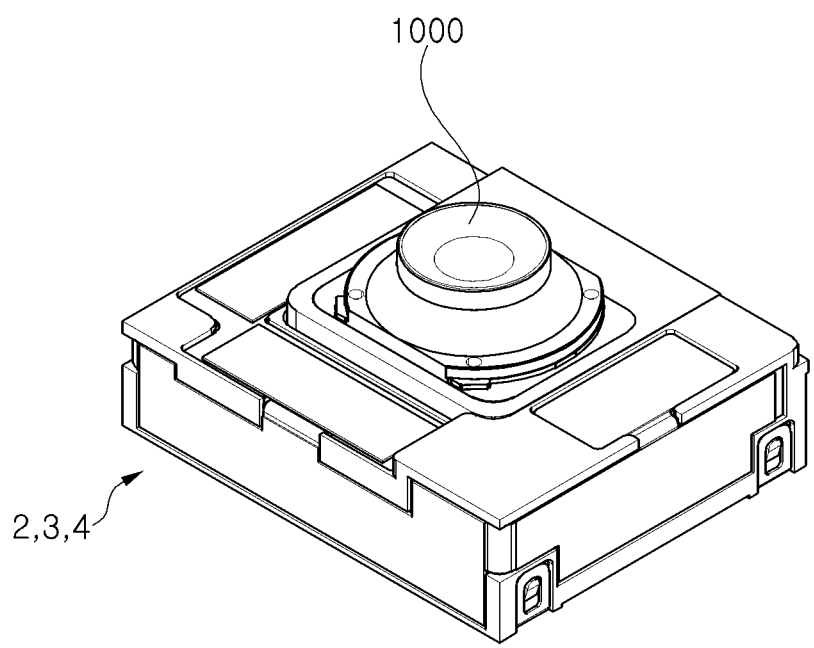
FIG. 13 is a perspective view of a camera module according to another example.
Figure 14:
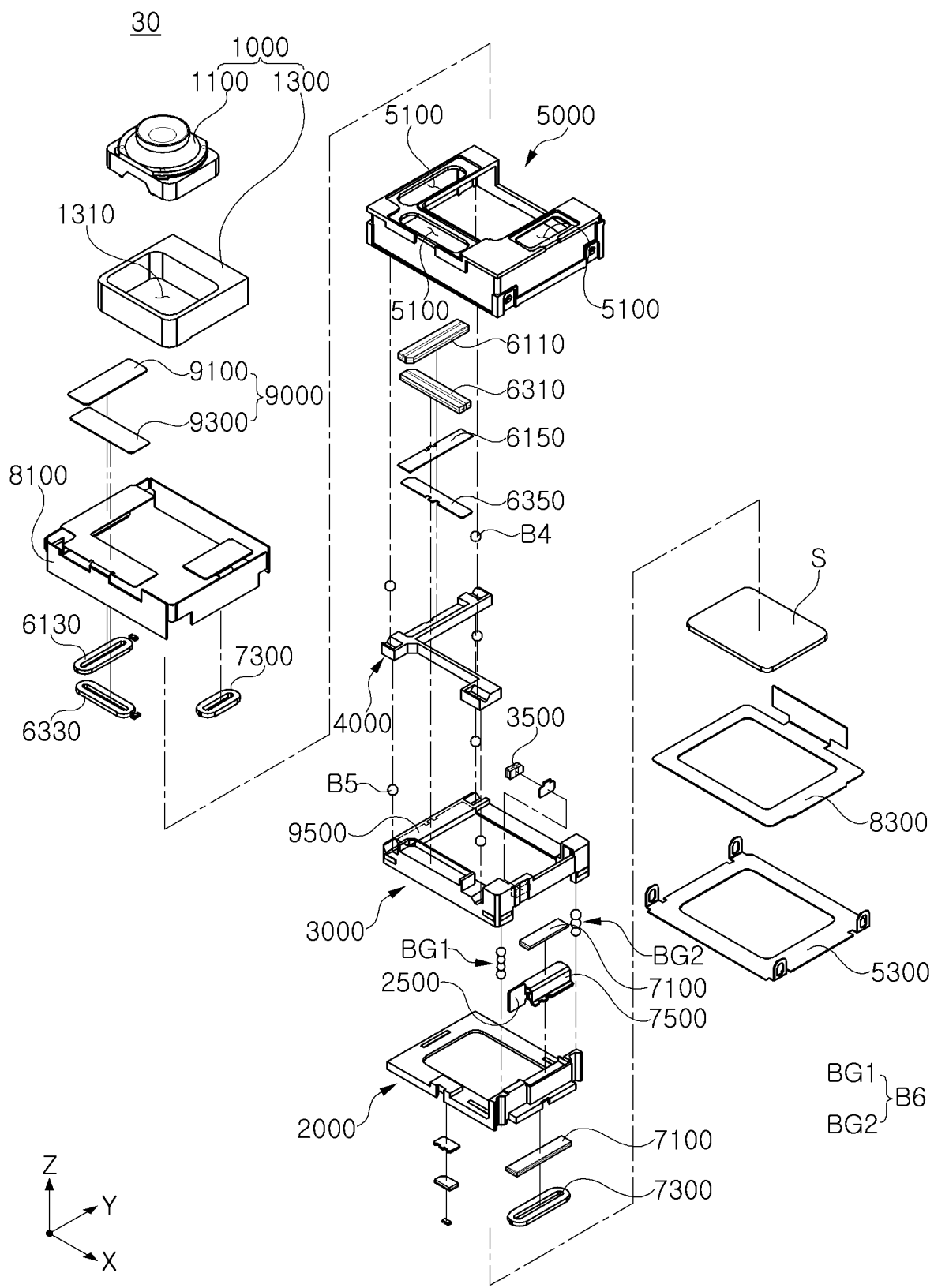
FIG. 14 is a schematic exploded perspective view of a camera module according to another example.

FIG. 13 is a perspective view of a camera module according to another example, and FIG. 14 is a schematic exploded perspective view of a camera module according to another example.

Figure 15:
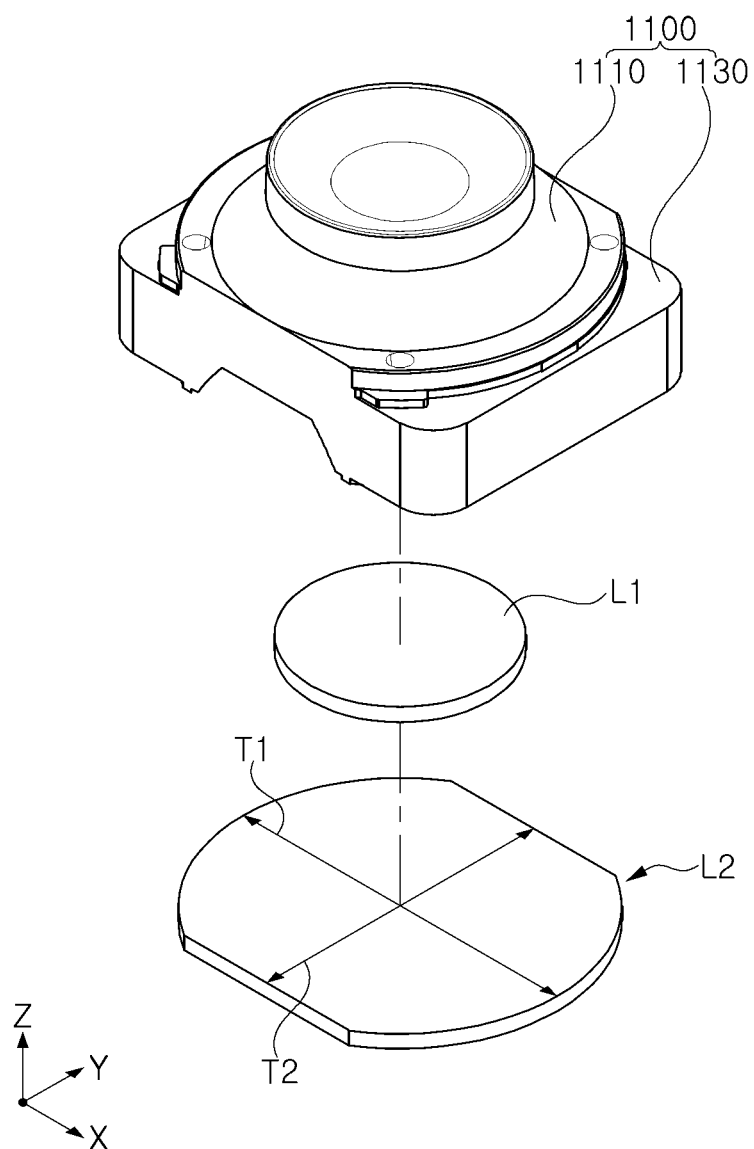
FIG. 15 is a perspective view of a lens and a lens barrel.
Figure 16:
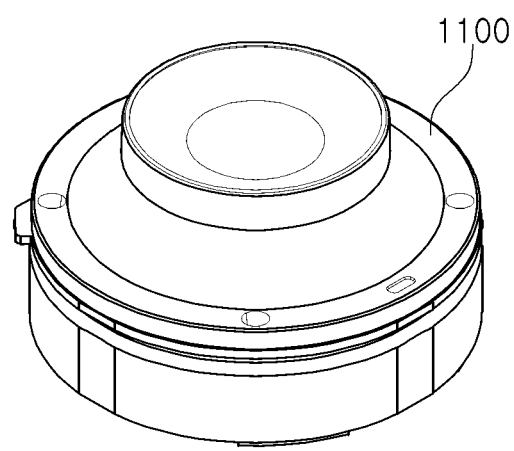
FIG. 16 is a modified example of the lens barrel.

FIG. 15 is a perspective view of a lens and a lens barrel, and FIG. 16 is a modified example of the lens barrel.

Referring to FIGS. 13 and 14, the camera module 30 according to another example includes a lens module 1000 and an actuator 2.

The lens module 1000 includes at least one lens L and a lens barrel 1100. At least one lens L is disposed inside the lens barrel 1100. When a plurality of lenses L are provided, the plurality of lenses L are mounted in the lens barrel 1100 along the optical axis (Z-axis).

The lens module 1000 may further include a lens holder 1300 coupled to the lens barrel 1100.

The lens holder 1300 is provided with a coupling hole 1310 penetrating through the lens holder 1300 in the optical axis (Z-axis) direction. The lens barrel 1100 is inserted into the coupling hole 1310 and fixedly disposed in the lens holder 1300. The lens holder 1300 may serve to fix the lens barrel 1100 with respect to the housing 5000. In another example, the lens barrel 1100 may also be directly coupled to the housing 5000 and fixed.

In this example, the lens module 1000 is a fixing member fixed to the housing 5000. For example, the lens module 1000 is a fixed member that does not move during autofocusing (AF) and optical image stabilization (OIS).

The camera module 30 may perform autofocusing (AF) and optical image stabilization (OIS) by moving the image sensor S instead of the lens module 1000. Since the relatively light image sensor S is moved, the image sensor S may be moved with relatively less driving force. Accordingly, the components constituting the actuator 2 may be downsized.

Light is incident from the top to the bottom with reference to FIGS. 13 and 14. For example, the drawings illustrated in FIGS. 13 and 14 are inverted upwardly and downwardly when compared with FIGS. 2 and 3.

The actuator 2 includes a carrier 2000, a base 3000, a guide member 4000, and a housing 5000.

The carrier 2000 may move in an optical axis (Z-axis) direction and in a direction perpendicular to the optical axis (Z-axis). Referring to FIG. 14, the image sensor S is disposed on the carrier 2000.

Accordingly, the image sensor S is moved together with the carrier 2000 in the optical axis (Z-axis) direction to adjust the focus, and the image sensor S is moved together with the carrier 2000 in a direction perpendicular to the optical axis (Z-axis), to compensate for camera shake during shooting.

The base 3000 may be moved in a direction perpendicular to the optical axis (Z-axis). For example, the base 3000 is a fixed member that does not move in the optical axis (Z-axis) direction during focus adjustment, but is a movable member that moves in a direction perpendicular to the optical axis (Z-axis) during optical image stabilization.

Since the carrier 2000 is disposed on the base 3000, the base 3000 and the carrier 2000 are moved together in a direction perpendicular to the optical axis (Z-axis) to compensate for camera shake. During focus adjustment, the carrier 2000 is moved relative to the base 3000.

The base 3000 is disposed within the housing 5000. A guide member 4000 is disposed between the base 3000 and the housing 5000. For example, the guide member 4000 and the base 3000 are sequentially disposed in the housing 5000 in the optical axis (Z-axis) direction.

The guide member 4000 may be configured to be movable in the first axis (X-axis) direction, and the base 3000 may be configured to be movable in the first axis (X-axis) direction and the second axis (Y-axis) direction.

For example, the guide member 4000 and the base 3000 may move together in the first axis (X-axis) direction. In addition, the base 3000 may be moved in the second axis (Y-axis) direction relative to the guide member 4000.

The first axis (X-axis) direction may indicate a direction perpendicular to the optical axis (Z-axis), and the second axis (Y-axis) direction may indicate a direction perpendicular to both the optical axis (Z-axis) direction and the first axis (X-axis) direction.

A first ball member B4 is disposed between the guide member 4000 and the housing 5000, and a second ball member B5 is disposed between the guide member 4000 and the base 3000.

The first ball member B4 is disposed to contact the guide member 4000 and the housing 5000, respectively, and the second ball member B5 is disposed to contact the guide member 4000 and the base 3000, respectively.

The carrier 2000 is disposed on the base 3000. For example, the carrier 2000 and the base 3000 may be stacked in the optical axis (Z-axis) direction. When adjusting the focus, the base 3000 is a fixed member that does not move in the optical axis (Z-axis) direction, and the carrier 2000 is a movable member that moves in the optical axis (Z-axis) direction.

A third ball member B6 is disposed between the carrier 2000 and the base 3000. The third ball member B6 is disposed to contact the carrier 2000 and the base 3000, respectively.

The third ball member B6 supports the movement of the carrier 2000 by rolling in the optical axis (Z-axis) direction when the carrier 2000 is moved in the optical axis (Z-axis) direction relative to the base 3000.

Referring to FIGS. 15 and 16, the lens barrel 1100 may be configured to have a partially cylindrical shape, or may be configured to have a cylindrical shape as a whole.

Referring to FIG. 15, the lens barrel 1100 may include a first barrel 1110 and a second barrel 1130. The first barrel 1110 and the second barrel 1130 may be used to refer to the upper part and the lower part of one lens barrel 1100, respectively. In another example, the first barrel 1110 and the second barrel 1130 may be provided as separate components and coupled to each other.

The first barrel 1110 may have a cylindrical shape having an internal space, and the second barrel 1130 may have a quadrangular box shape having an internal space. The upper surface of the first barrel 1110 and the lower surface of the second barrel 1130 are provided with passage holes through which light passes, respectively.

A lens (L1, hereinafter referred to as a 'first lens') having a circular planar shape is disposed inside the first barrel 1110, and a lens (L2, hereinafter referred to as a 'second lens') having a non-circular planar shape is disposed inside the second barrel 1130.

For example, the second lens L2 is non-circular when viewed in the optical axis (Z-axis) direction.

In a plane perpendicular to the optical axis (Z-axis), the second lens L2 has a length T1 in the direction of the first axis (X-axis) perpendicular to the optical axis (Z-axis), which is greater than a length T2 in the second axis (Y-axis) direction perpendicular to both the optical axis (Z-axis) and the first axis (X-axis) direction.

For example, the second lens L2 has a major axis and a minor axis. A line segment connecting both sides of the second lens L2 in the first axis (X-axis) direction while passing through the optical axis (Z-axis) is the major axis, and a line segment connecting both sides of the second lens L2 in the second axis (Y-axis) direction while passing through the optical axis (Z-axis) is the minor axis. The major axis and the minor axis are perpendicular to each other, and the length of the major axis is greater than the length of the minor axis.

The second lens L2 has four side surfaces along the circumference of the second lens L2. When viewed in the optical axis direction, two of the four side surfaces have an arc shape, and the other two side surfaces have a substantially linear shape.

In general, since the image sensor S of the camera module 30 is rectangular, not all of the light refracted by the circular lens forms an image on the image sensor S.

In this example, since the second lens L2 has a non-circular planar shape, the lens L and the lens barrel 1100 may be miniaturized without affecting image formation, and accordingly, the size of the camera module 30 may be reduced.

On the other hand, the second lens L2 has the major axis and the minor axis, and thus has a maximum diameter and a minimum diameter. In this case, the maximum diameter of the second lens L2 is greater than the diameter of the first lens L1.

For example, the second lens L2 having a relatively great diameter may have a non-circular planar shape.

Figure 17:
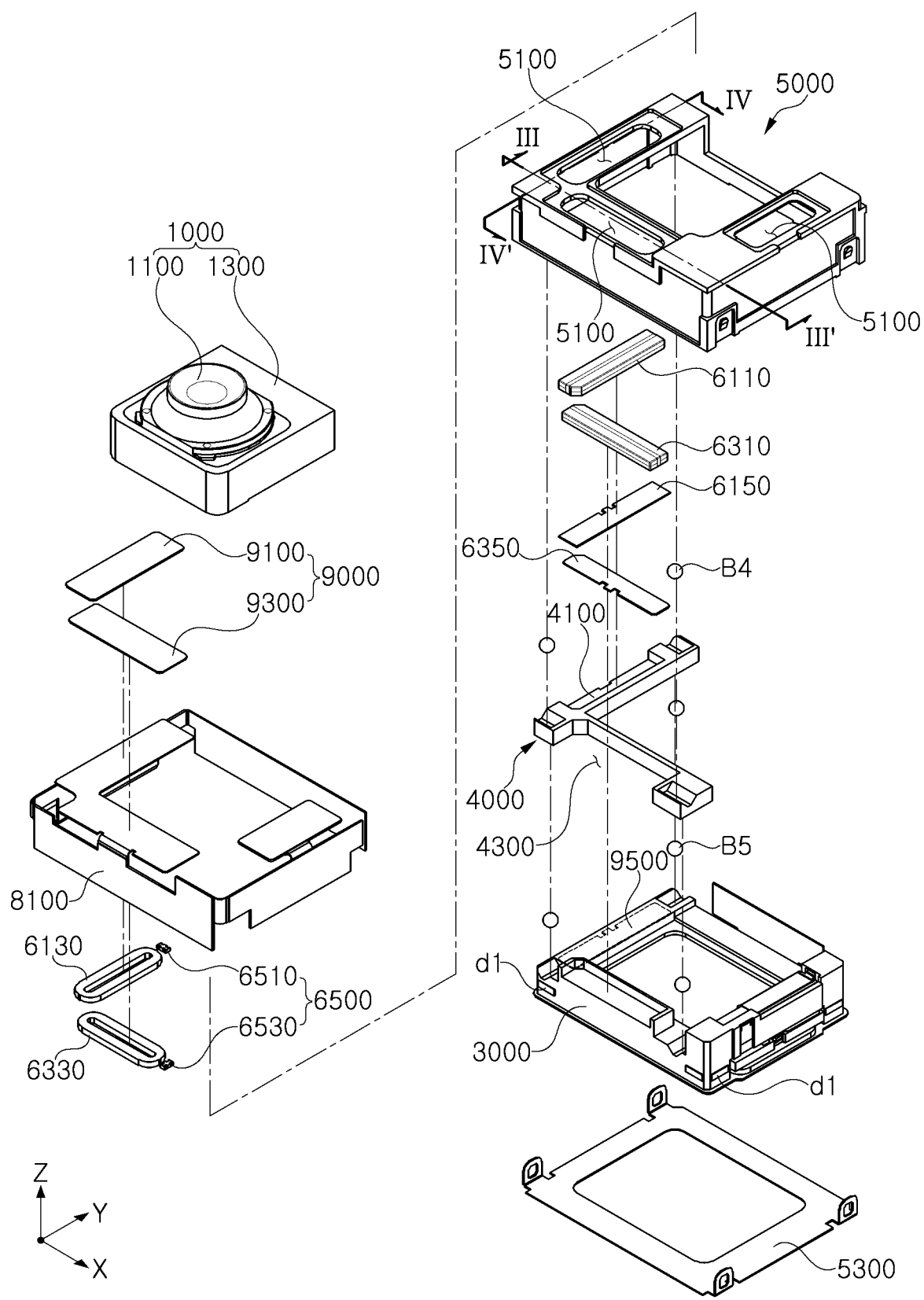
FIG. 17 is an exploded perspective view of a lens module, a first substrate, a housing, a guide member, and a base.
Figure 18:
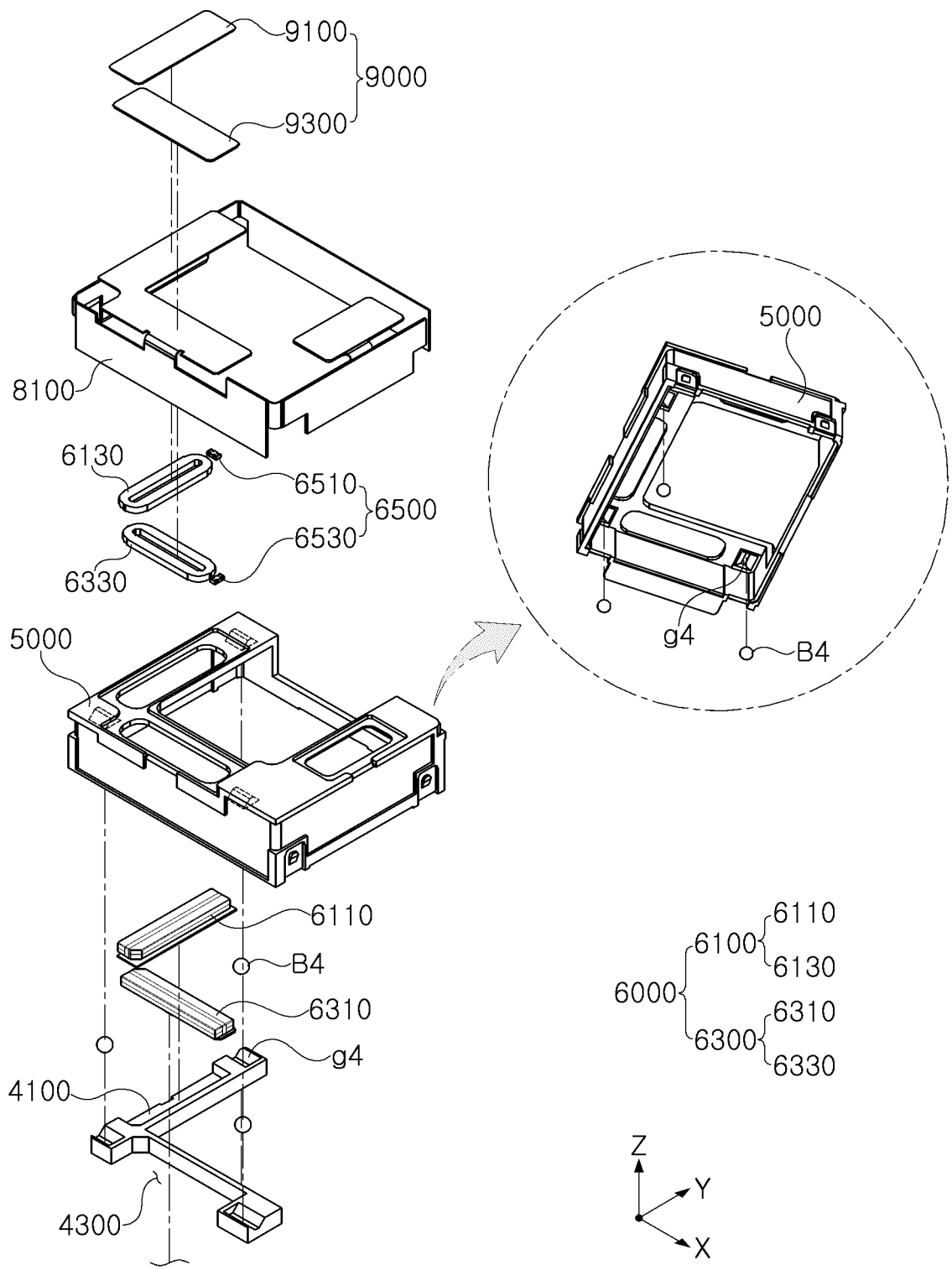
FIG. 18 is an exploded perspective view of a first substrate, a housing, and a guide member.
Figure 19:
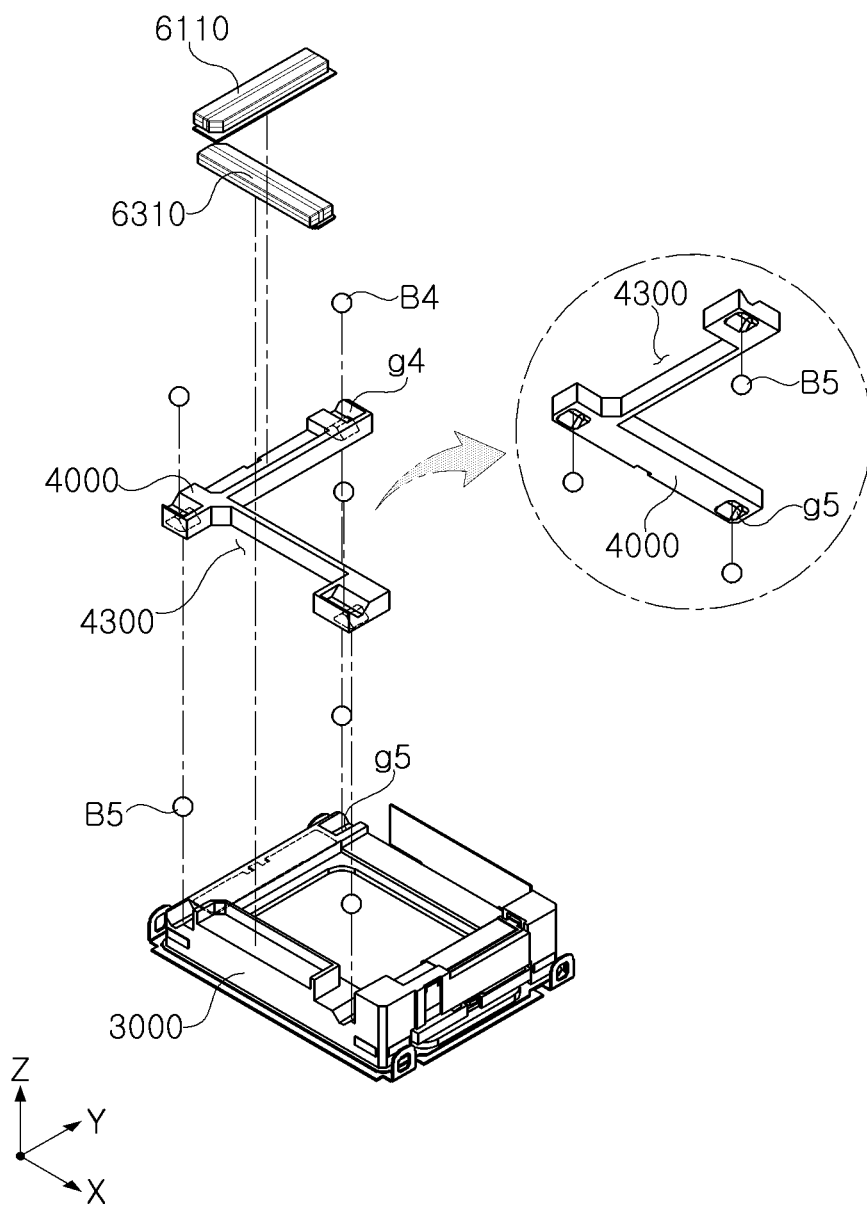
FIG. 19 is an exploded perspective view of the guide member and the base.
Figure 20:
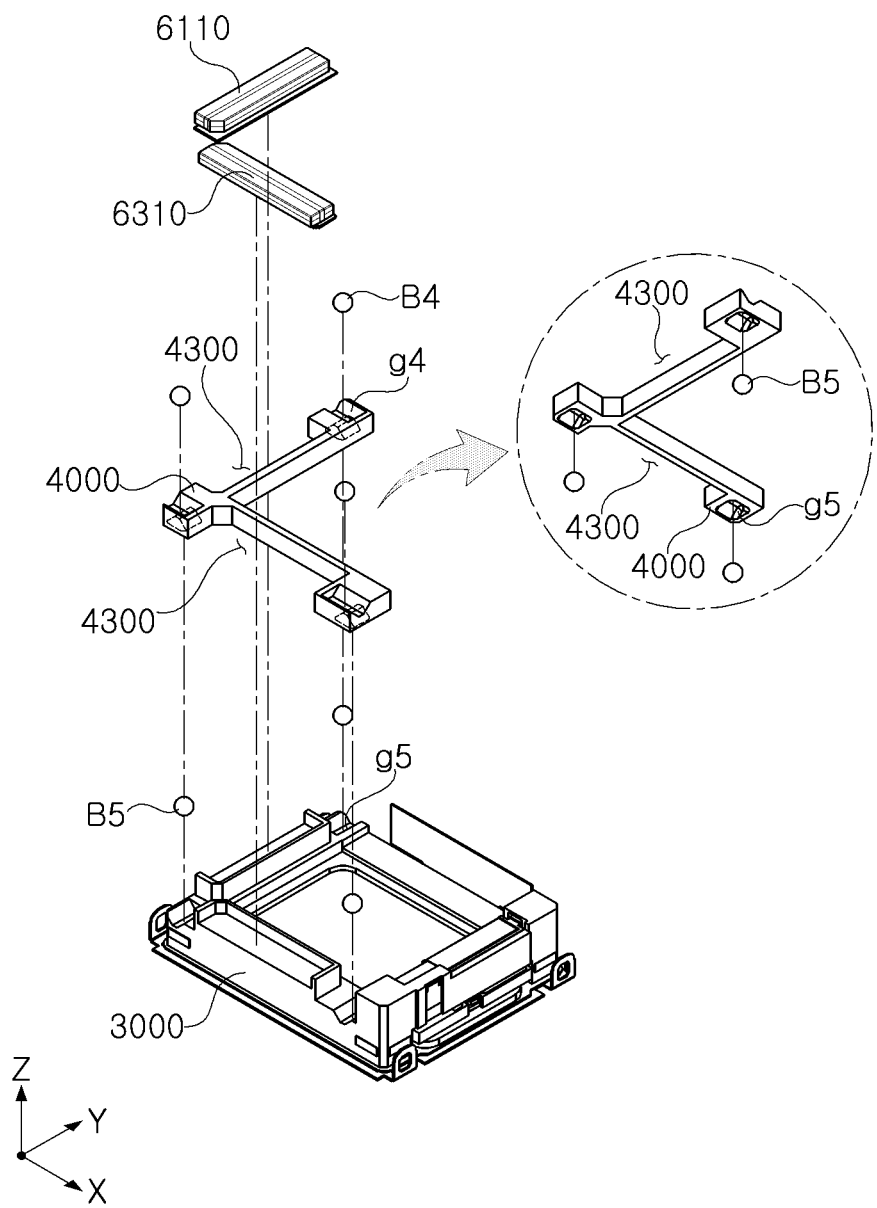
FIG. 20 is a modified example of the guide member and the base.

FIG. 17 is an exploded perspective view of the lens module, the first substrate, the housing, the guide member and the base, FIG. 18 is an exploded perspective view of the first substrate, the housing, and the guide member, FIG. 19 is an exploded perspective view of the guide member and the base, and FIG. 20 is a modified example of the guide member and the base.

Figure 21:
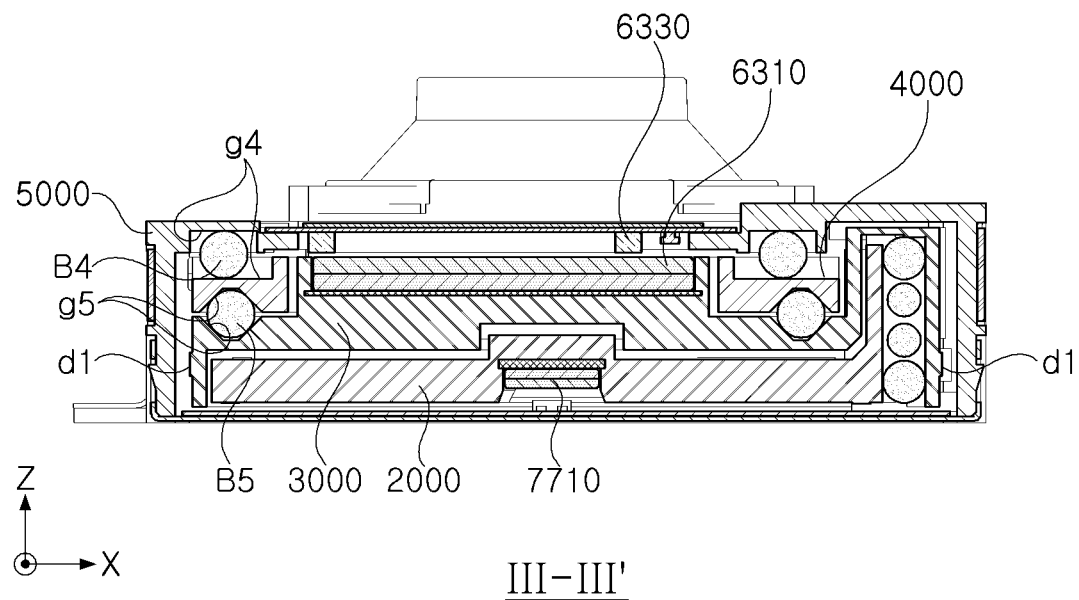
FIG. 21 is a cross-sectional view taken along line III-III' of FIG. 17.
Figure 22:
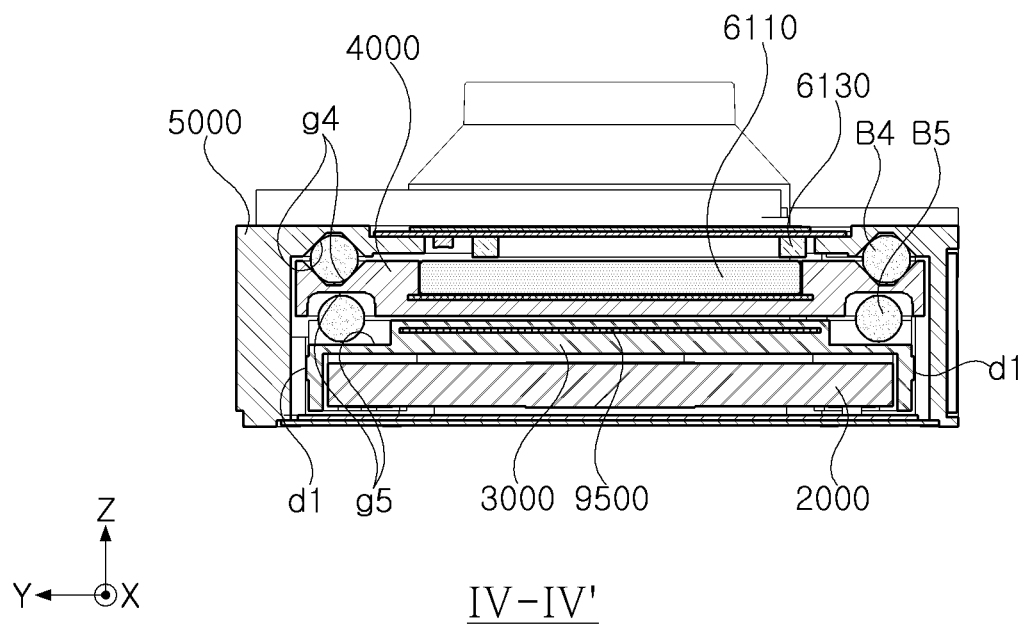
FIG. 22 is a cross-sectional view taken along line IV-IV' of FIG. 17.

Also, FIG. 21 is a cross-sectional view taken along line III-III' of FIG. 17, and FIG. 22 is a cross-sectional view taken along line IV-IV' of FIG. 17.

With reference to FIGS. 17 to 22, movement of the base 3000 and the guide member 4000 in a direction perpendicular to the optical axis (Z-axis) will be described.

The guide member 4000 and the base 3000 are disposed in the housing 5000. For example, the guide member 4000 and the base 3000 are sequentially disposed in the housing 5000 in the optical axis (Z-axis) direction. Accordingly, the guide member 4000 is disposed between the housing 5000 and the base 3000.

When viewed in the optical axis (Z-axis) direction, the guide member 4000 may have a shape in which two sides of a quadrangle are removed. For example, the guide member 4000 may have an ']' or '[' shape when viewed in the optical axis (Z-axis) direction.

Since the guide member 4000 is disposed between the housing 5000 and the base 3000, reducing the thickness of the guide member 4000 reduces the height of the actuator 1 in the optical axis (Z-axis) direction.

However, in the case in which the thickness of the guide member 4000 is reduced, the rigidity of the guide member 4000 may be weakened, reducing resistance to external shocks.

Accordingly, the guide member 4000 may be provided with a reinforcing plate to reinforce the rigidity of the guide member 4000.

For example, the reinforcing plate may be integrally coupled to the guide member 4000 by insert injection. In this case, the reinforcing plate may be manufactured to be integrated with the guide member 4000 by injecting a resin material into the mold while the reinforcing plate is fixed in the mold.

The reinforcing plate may be disposed inside the guide member 4000. In addition, the reinforcing plate may be disposed such that a portion thereof is exposed to the outside of the guide member 4000. In this manner, while the reinforcing plate is integrally formed inside the guide member 4000, by exposing a portion of the reinforcing plate to the outside of the guide member 4000, the coupling force between the reinforcing plate and the guide member 4000 may be improved, and the reinforcing plate may be prevented from being separated from the guide member 4000.

The reinforcing plate may be formed of a non-magnetic metal such that the reinforcing plate does not affect the magnetic fields of a first magnet 6110 and a second magnet 6130 of the first driving unit 6000 to be described later.

The guide member 4000 may be configured to be movable in the first axis (X-axis) direction, and the base 3000 may be configured to be movable in the first axis (X-axis) direction and the second axis (Y-axis) direction.

For example, the guide member 4000 and the base 3000 may move together in the first axis (X-axis) direction. In addition, the base 3000 may be moved in the second axis (Y-axis) direction relative to the guide member 4000.

The carrier 2000 is disposed on the base 3000, and the image sensor S is disposed on the carrier 2000. Accordingly, as the base 3000 moves in the first axis (X-axis) direction and the second axis (Y-axis) direction, the carrier 2000 and the image sensor S may also move in the first axis (X-axis) direction and the second axis (Y-axis) direction.

The actuator 2 according to this example includes a first driving unit 6000. The first driving unit 6000 may generate driving force in a direction perpendicular to the optical axis (Z-axis) to move the base 3000 in a direction perpendicular to the optical axis (Z-axis).

The first driving unit 6000 includes a first sub-driving unit 6100 and a second sub-driving unit 6300. The first sub-driving unit 6100 may generate driving force in the first axis (X-axis) direction, and the second sub-driving unit 6300 may generate driving force in the second axis (Y-axis) direction.

The first sub-driving unit 6100 includes the first magnet 6110 and the first coil 6130. The first magnet 6110 and the first coil 6130 may be disposed to face each other in the optical axis (Z-axis) direction.

The first magnet 6110 is disposed on the guide member 4000. For example, the first magnet 6110 may be disposed on one side of the guide member 4000 having an '┐' or '└' shape. A mounting groove 4100 in which the first magnet 6110 is disposed may be provided on one side of the guide member 4000. By inserting the first magnet 6110 into the mounting groove 4100, an increase in the overall height of the actuator 1 and the camera module 30 due to the thickness of the first magnet 6110 may be prevented.

A first back yoke 6150 may be disposed between the guide member 4000 and the first magnet 6110. The first back yoke 6150 may improve the driving force by preventing the magnetic flux of the first magnet 6110 from leaking.

The first magnet 6110 may be magnetized such that one surface (e.g., a surface facing the first coil 6130) has both an N pole and an S pole. For example, on one surface of the first magnet 6110 facing the first coil 6130, an N pole, a neutral region and an S pole may be sequentially provided in the first axis (X-axis) direction. The first magnet 6110 has a shape having a length in the second axis (Y-axis) direction.

The other surface (e.g., the surface opposing the one surface) of the first magnet 6110 may be magnetized to have both an S pole and an N pole. For example, on the other surface of the first magnet 6110, an S pole, a neutral region, and an N pole may be sequentially provided in the first axis (X-axis) direction.

The first coil 6130 is disposed to face the first magnet 6110. For example, the first coil 6130 may be disposed to face the first magnet 6110 in the optical axis (Z-axis) direction. The first coil 6130 has a hollow donut shape, and has a length in the second axis (Y-axis) direction.

The first coil 6130 is disposed on a first substrate 8100. The first substrate 8100 is mounted on the housing 5000 such that the first magnet 6110 and the first coil 6130 face each other in the optical axis (Z-axis) direction.

A through-hole 5100 is provided in the housing 5000. For example, the through-hole 5100 may be configured to penetrate through the upper surface of the housing 5000 in the optical axis (Z-axis) direction. The first coil 6130 is disposed in the through-hole 5100 of the housing 5000. By disposing the first coil 6130 in the through-hole 5100 of the housing 5000, the overall height of the actuator 2 and the camera module 30 may be prevented from increasing due to the thickness of the first coil 6130.

The first magnet 6110 is a movable member that is mounted on the guide member 4000 and moves together with the guide member 4000, and the first coil 6130 is a fixed member fixed to the first substrate 8100 and the housing 5000.

When power is applied to the first coil 6130, the guide member 4000 may be moved in the first axis (X-axis) direction by the electromagnetic force between the first magnet 6110 and the first coil 6130.

The second sub-driving unit 6300 includes a second magnet 6310 and a second coil 6330. The second magnet 6310 and the second coil 6330 may be disposed to face each other in the optical axis (Z-axis) direction.

The second magnet 6310 is disposed on the base 3000. A second back yoke 6350 may be disposed between the base 3000 and the second magnet 6310. The second back yoke 6350 may improve driving force by preventing the magnetic flux of the second magnet 6310 from leaking.

An escape hole 4300 is provided in the guide member 4000 such that the second magnet 6310 and the second coil 6330 may directly face each other. For example, the escape hole 4300 may be provided in the other side (the side where the first magnet 6110 is not disposed) of the guide member 4000 having a '┐' or '└' shape. The escape hole 4300 may penetrate through the other side of the guide member 4000 in the optical axis (Z-axis) direction.

The second magnet 6310 is disposed in the escape hole 4300 of the guide member 4000 in a state mounted on the base 3000. Accordingly, the second magnet 6310 may directly face the second coil 6330 through the escape hole 4300.

The guide member 4000 and the base 3000 are sequentially disposed in the optical axis (Z-axis) direction in the housing 5000, and even when the second magnet 6310 is disposed on the base 3000, the total height of the actuator 2 and the camera module 30 may be prevented from increasing, by the escape hole 4300 provided in the guide member 4000.

The second magnet 6310 may be magnetized such that one surface (e.g., a surface facing the second coil 6330) has both an S pole and an N pole. For example, an S pole, a neutral region, and an N pole may be sequentially provided on one surface of the second magnet 6310 facing the second coil 6330 in the second axis (Y-axis) direction. The second magnet 6310 has a shape having a length in the first axis (X-axis) direction.

The other surface (e.g., the surface opposing the one surface) of the second magnet 6310 may be magnetized to have both an N pole and an S pole. For example, on the other surface of the second magnet 6310, an N pole, a neutral region, and an S pole may be sequentially provided in the second axis (Y-axis) direction.

The second coil 6330 is disposed to face the second magnet 6310. For example, the second coil 6330 may be disposed to face the second magnet 6310 in the optical axis (Z-axis) direction. The second coil 6330 has a hollow donut shape, and has a length in the first axis (X-axis) direction.

The second coil 6330 is disposed on the first substrate 8100. The first substrate 8100 is mounted on the housing 5000 such that the second magnet 6310 and the second coil 6330 face each other in the optical axis (Z-axis) direction.

A through-hole 5100 is provided in the housing 5000. For example, the through-hole 5100 may be configured to penetrate through the upper surface of the housing 5000 in the optical axis (Z-axis) direction. The second coil 6330 is disposed in the through-hole 5100 of the housing 5000. By disposing the second coil 6330 in the through-hole 5100 of the housing 5000, the overall height of the actuator 2 and the camera module 30 may be prevented from increasing due to the thickness of the second coil 6330.

The second magnet 6310 is a moving member that is mounted on the base 3000 and moves together with the base 3000, and the second coil 6330 is a fixed member fixed to the first substrate 8100 and the housing 5000.

When power is applied to the second coil 6330, the base 3000 may be moved in the second axis (Y-axis) direction by electromagnetic force acting between the second magnet 6310 and the second coil 6330.

In this example, the first magnet 6110 is mounted on the guide member 4000, and the second magnet 6310 is mounted on the base 3000. As another example, referring to FIG. 20, both the first magnet 6110 and the second magnet 6310 may be mounted on the base 3000. In this case, the escape hole 4300 may also be provided in the one side of the guide member 4000.

As illustrated in FIG. 17, the first coil 6130 and the second coil 6330 may be provided as winding coils and mounted on the first substrate 8100. In another example, the first coil 6130 and the second coil 6330 may be a copper foil pattern stacked and embedded in the first substrate 8100.

The first magnet 6110 and the second magnet 6310 are disposed perpendicular to each other in a plane perpendicular to the optical axis (Z-axis), and the first coil 6130 and the second coil 6330 are also located perpendicular to each other in a plane perpendicular to the optical axis (Z-axis).

A first ball member B4 is disposed between the guide member 4000 and the housing 5000, and a second ball member B5 is disposed between the guide member 4000 and the base 3000.

The first ball member B4 is disposed to contact the guide member 4000 and the housing 5000, respectively, and the second ball member B5 is disposed to contact the guide member 4000 and the base 3000, respectively.

The first ball member B4 and the second ball member B5 function to guide the movement of the guide member 4000 and the base 3000 during the camera shake compensation process, and in addition, also function to maintain a gap between the base 3000, the guide member 4000, and the housing 5000.

The first ball member B4 guides the movement of the guide member 4000 in the first axis (X-axis) direction, and the second ball member B5 guides the movement of the base 3000 in the second axis (Y-axis) direction.

For example, when the driving force in the first axis (X-axis) direction is generated, the first ball member B4 rolls in the first axis (X-axis) direction. Accordingly, the first ball member B4 guides the movement of the guide member 4000 in the first axis (X-axis) direction.

In addition, when the driving force in the second axis (Y-axis) direction is generated, the second ball member B2 rolls in the second axis (Y-axis) direction. Accordingly, the second ball member B2 guides the movement of the base 3000 in the second axis (Y-axis) direction.

The first ball member B4 includes a plurality of balls disposed between the guide member 4000 and the housing 5000, and the second ball member B5 includes a plurality of balls disposed between the base 3000 and the guide member 4000.

Referring to FIG. 18, at least one of the surfaces of the guide member 4000 and the housing 5000, facing each other in the optical axis (Z-axis) direction, is provided with a first guide groove g4 in which the first ball member B4 is disposed. The first guide groove g4 is provided as a plurality of first guide grooves g4 to correspond to the plurality of balls of the first ball member B4.

The first ball member B4 is disposed in the first guide groove g4 and is fitted between the guide member 4000 and the housing 5000.

In the state accommodated in the first guide groove g4, the first ball member B4 is limited in movement in the optical axis (Z-axis) and the second axis (Y-axis) direction, and may only be moved in the first axis (X-axis) direction. As an example, the first ball member B4 is capable of rolling motion only in the first axis (X-axis) direction.

To this end, the first guide groove g4 may have a shape having a length in the first axis (X-axis) direction.

Referring to FIG. 19, at least one of the surfaces of the base 3000 and the guide member 4000, facing each other in the optical axis (Z-axis) direction, has a second guide groove g5 in which the second ball member B5 is disposed. The second guide groove g5 is provided as a plurality of second guide grooves to correspond to the plurality of balls of the second ball member B5.

The second ball member B5 is accommodated in the second guide groove g5 and fitted between the base 3000 and the guide member 4000.

In the state accommodated in the second guide groove g5, the second ball member B5 is limited in movement in the optical axis (Z-axis) and the first axis (X-axis) direction, and may only be moved in the second axis (Y-axis) direction. As an example, the second ball member B5 is capable of rolling motion only in the second axis (Y-axis) direction.

To this end, the second guide groove g5 may have a shape having a length in the second axis (Y-axis) direction.

As illustrated in FIG. 21, when driving force is generated in the first axis (X-axis) direction, the guide member 4000 and the base 3000 are moved together in the first axis (X-axis) direction.

At this time, the first ball member B4 disposed between the guide member 4000 and the housing 5000 rolls along the first axis (X-axis).

The second ball member B5 is disposed between the guide member 4000 and the base 3000, and the second ball member B5 is limited in movement in the first axis (X-axis) direction, and as a result, as the guide member 4000 is moved in the first axis (X-axis) direction, the base 3000 is also moved in the first axis (X-axis) direction.

As illustrated in FIG. 22, when driving force is generated in the second axis (Y-axis) direction, the base 3000 is moved in the second axis (Y-axis) direction.

At this time, the second ball member B5 disposed between the base 3000 and the guide member 4000 rolls along the second axis (Y-axis).

The guide member 4000 may move in the first axis (X-axis) direction, and the base 3000 may move in both the first axis (X-axis) direction and the second axis (Y-axis) direction.

Since the carrier 2000 is disposed on the base 3000 and the image sensor S is disposed on the carrier 2000, as a result, as the base 3000 moves, the carrier 2000 and the image sensor S also move in the first axis (X-axis) direction and the second axis (Y-axis) direction.

On the other hand, a first cushioning member d1 having elasticity may be disposed on at least one of the surfaces of the base 3000 and the housing 5000, facing each other in a direction perpendicular to the optical axis (Z-axis). For example, referring to FIGS. 21 and 22, the first cushioning member d1 may be disposed on a side surface of the base 3000. The base 3000 has four side surfaces, and on each side surface of the base 3000, the first cushioning members d1 may be disposed to be spaced apart from each other on at least two positions per side surface. The first cushioning member d1 may be formed of a material having elastic properties. For example, the first cushioning member d1 may be formed of a rubber material.

Therefore, when the base 3000 moving in both the first axis (X-axis) direction and the second axis (Y-axis) direction collides with the housing 5000, shock and noise are reduced by the first cushioning member d1.

The actuator 2 according to this example may detect a position of the base 3000 in a direction perpendicular to the optical axis (Z-axis).

To this end, a first position sensing unit 6500 is provided (see FIG. 17). The first position sensing unit 6500 includes a first position sensor 6510 and a second position sensor 6530. The first position sensor 6510 is disposed on the first substrate 8100 to face the first magnet 6110, and the second position sensor 6530 is disposed on the first substrate 8100 to face the second magnet 6310. The first position sensor 6510 and the second position sensor 6530 may be Hall sensors.

On the other hand, in another example, a separate position sensor may not be provided. In this case, the first coil 6130 and the second coil 6330 may function as the first position sensing unit 6500.

For example, the position of the base 3000 may be sensed through changes in inductance of the first coil 6130 and the second coil 6330.

For example, as the base 3000 moves, the first magnet 6110 and the second magnet 6310 also move, and accordingly, the inductance of the first coil 6130 and the second coil 6330 changes. Accordingly, the position of the base 3000 may be sensed through changes in inductance of the first coil 6130 and the second coil 6330.

On the other hand, referring to FIGS. 17 and 18, the actuator 2 according to this example includes a yoke portion 9000. The yoke portion 9000 provides pressing force such that a contact state of the base 3000, the guide member 4000, and the housing 5000 with the first ball member B4 and the second ball member B5 may be maintained.

The yoke portion 9000 includes a first yoke 9100 and a second yoke 9300, and the first yoke 9100 and the second yoke 9300 are fixed to the housing 5000. For example, the first yoke 9100 and the second yoke 9300 may be disposed on the first substrate 8100, and the first substrate 8100 may be fixed to the housing 5000.

The first coil 6130 and the second coil 6330 are disposed on one surface of the first substrate 8100, and the first yoke 9100 and the second yoke 9300 are disposed on the other surface of the first substrate 8100.

The first yoke 9100 is disposed to face the first magnet 6110 in the optical axis (Z-axis) direction, and the second yoke 9300 is disposed to face the second magnet 6310 in the optical axis (Z-axis) direction.

Accordingly, attractive force acts in the optical axis (Z-axis) direction, between the first yoke 9100 and the first magnet 6110 and between the second yoke 9300 and the second magnet 6310, respectively.

Therefore, since the base 3000 and the guide member 4000 are pressed in the direction toward the yoke portion 9000, the contact state of the base 3000, the guide member 4000 and the housing 5000 with the first ball member B4 and the second ball member B5 may be maintained.

The first yoke 9100 and the second yoke 9300 are materials capable of generating attractive force between the first magnet 6110 and the second magnet 6310. For example, the first yoke 9100 and the second yoke 9300 are provided as a magnetic body.

In this example, the first magnet 6110 is mounted on the guide member 4000, and the second magnet 6310 is mounted on the base 3000. Accordingly, the guide member 4000 is pulled toward the first yoke 9100 by the attractive force between the first yoke 9100 and the first magnet 6110, and the base 3000 is pulled toward the second yoke 9300 by the attractive force between the second yoke 9300 and the second magnet 6310.

In this case, referring to FIGS. 17 and 22, a third yoke 9500 may be provided on the base 3000 such that the guide member 4000 and the base 3000 are pressed against each other. The third yoke 9500 may be provided on the base 3000 to be disposed in a position facing the first magnet 6110 in the optical axis (Z-axis) direction.

Accordingly, attractive force also acts between the third yoke 9500 and the first magnet 6110 in the optical axis (Z-axis) direction, and accordingly, the guide member 4000 and the base 3000 may also be pressed against each other.

For example, when attractive force acts between the yoke portion 9000 and the first magnet 6110 and the second magnet 6310, the state of contact between the respective components may be released due to an external impact or the like. Accordingly, in this example, the cover 5300 is provided to improve resistance to external shocks and the like.

The cover 5300 may be hook-coupled to the housing 5000.

In the case of the actuator 2 according to this example, even when the carrier 2000 is moved in the optical axis (Z-axis) direction during focus adjustment, since the relative positions of the first magnet 6110 and the first coil 6130 and the relative positions of the second magnet 6310 and the second coil 6330 do not change, the driving force for optical image stabilization may be precisely controlled.

Figure 23:
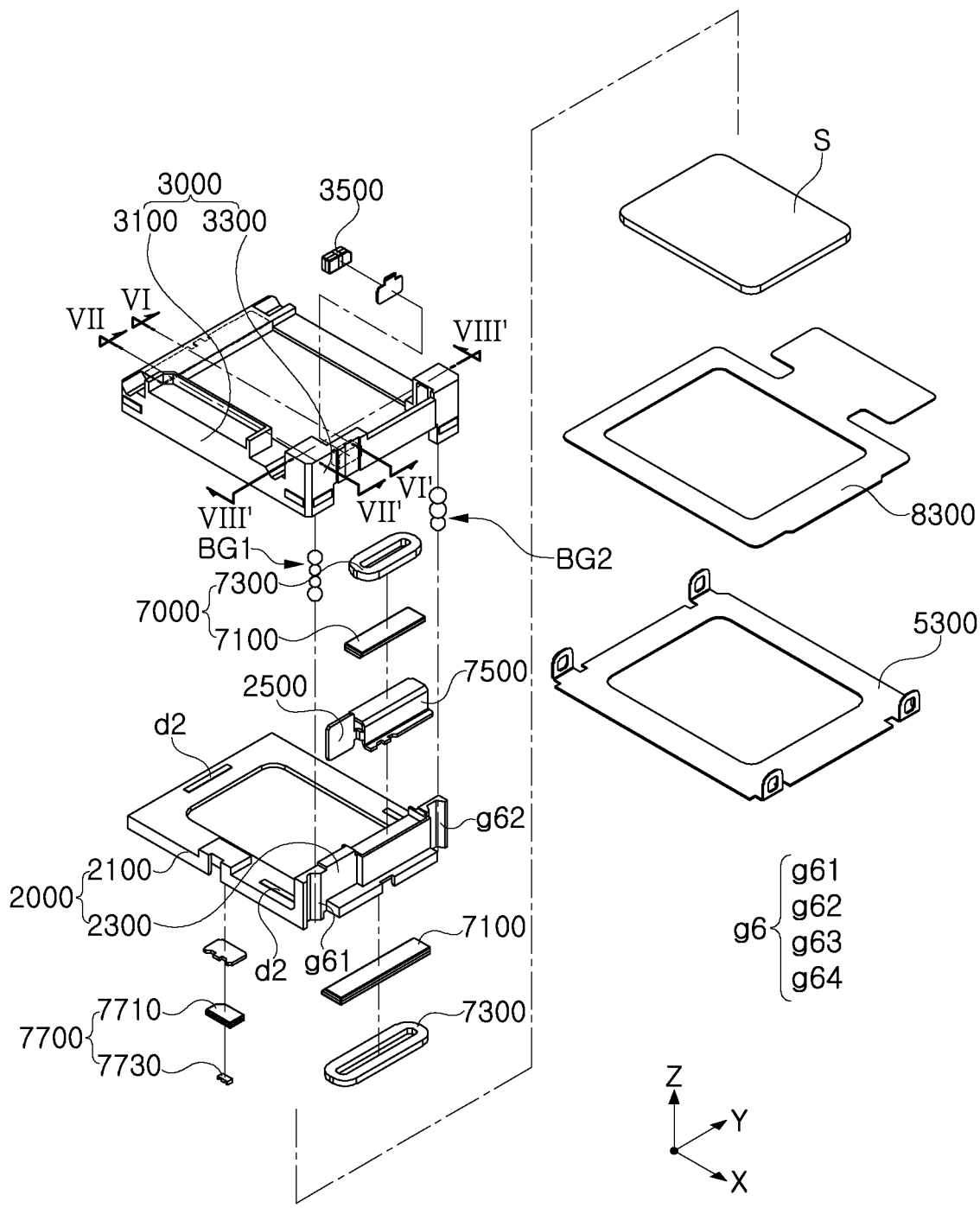
FIG. 23 is an exploded perspective view of the carrier and the base.
Figure 24A:
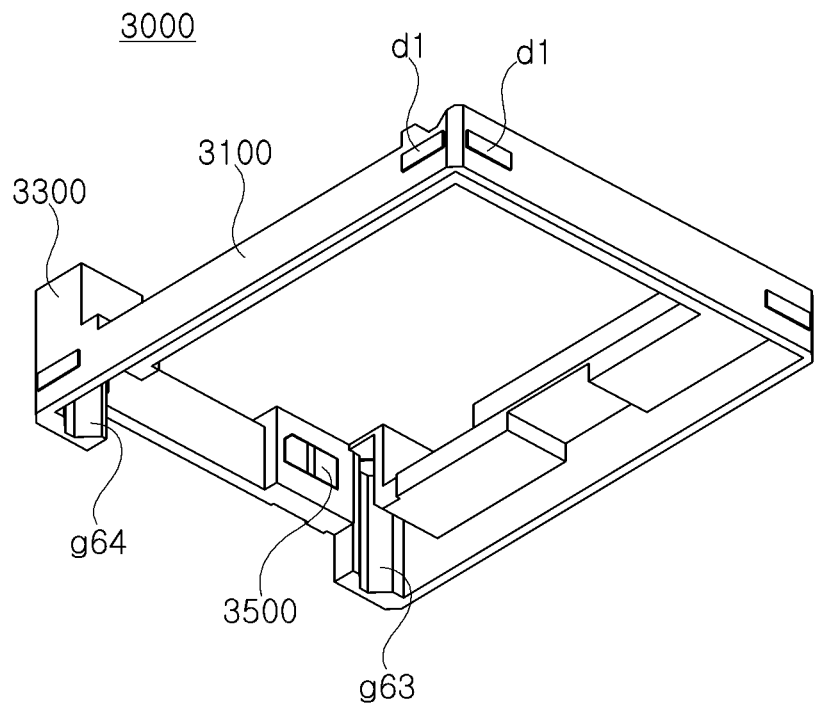
FIGS. 24A and 24B are bottom perspective views of the base.
Figure 24B:
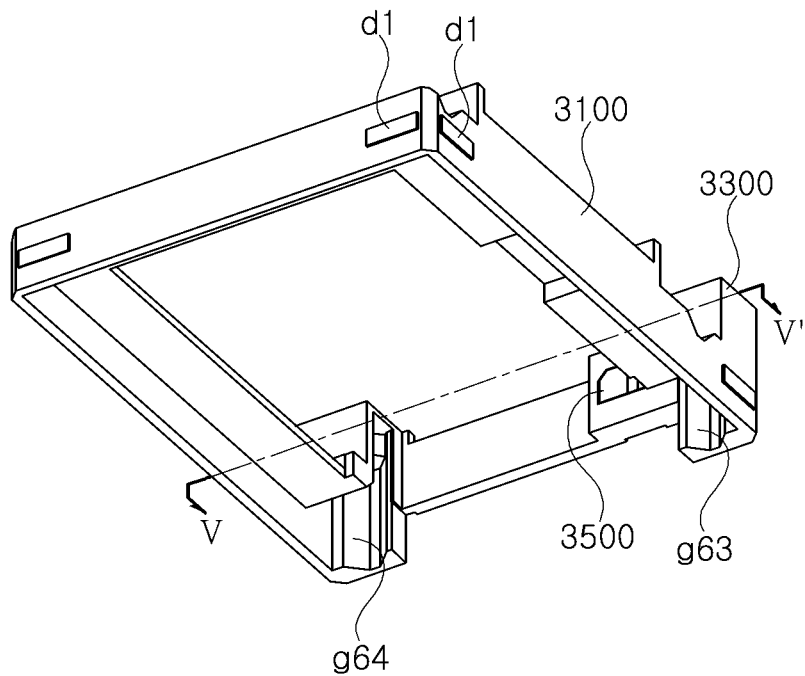
Figure 25:
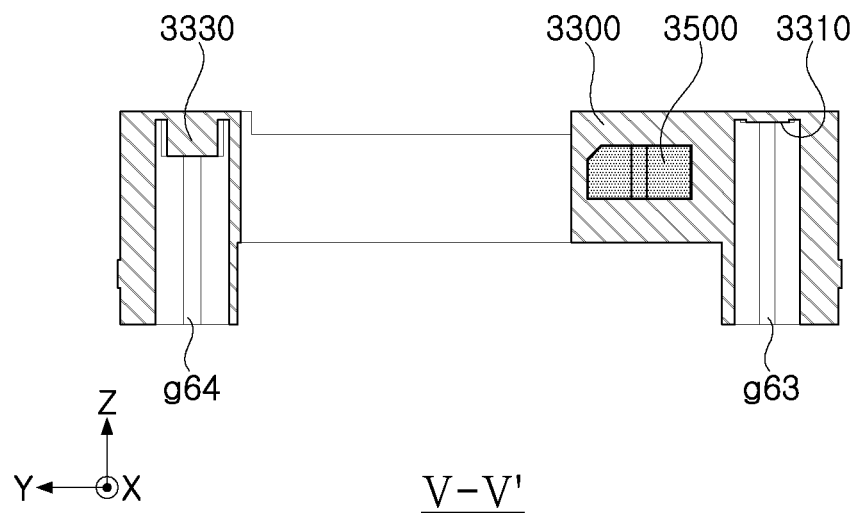
FIG. 25 is a cross-sectional view taken along line V-V' of FIG. 24B.
Figure 26:
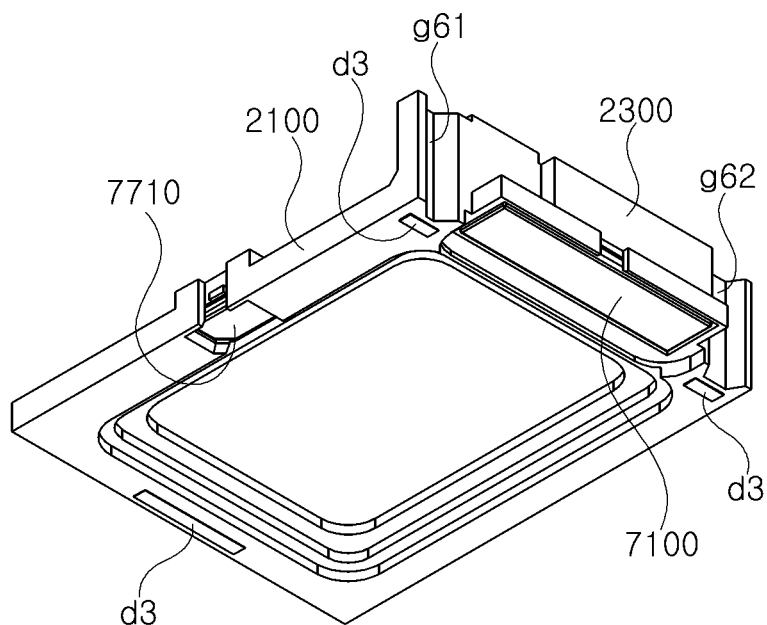
FIG. 26 is a bottom perspective view of the carrier.

FIG. 23 is an exploded perspective view of the carrier and the base, FIGS. 24A and 24B are bottom perspective views of the base, FIG. 25 is a cross-sectional view taken along line V-V' of FIG. 24B, and FIG. 26 is a bottom perspective view of the carrier.

Figure 27:
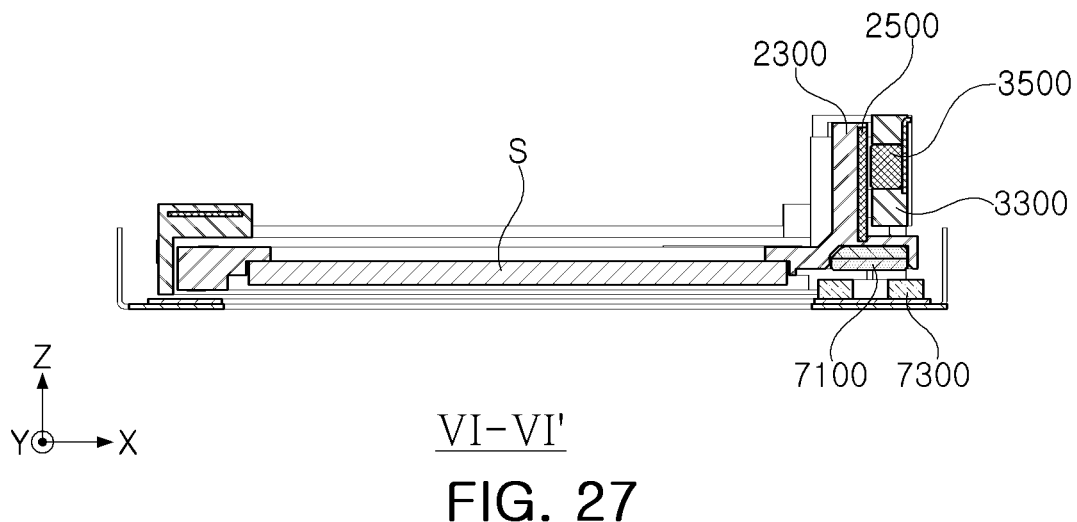
FIG. 27 is a cross-sectional view taken along line VI-VI' of FIG. 23.
Figure 28:
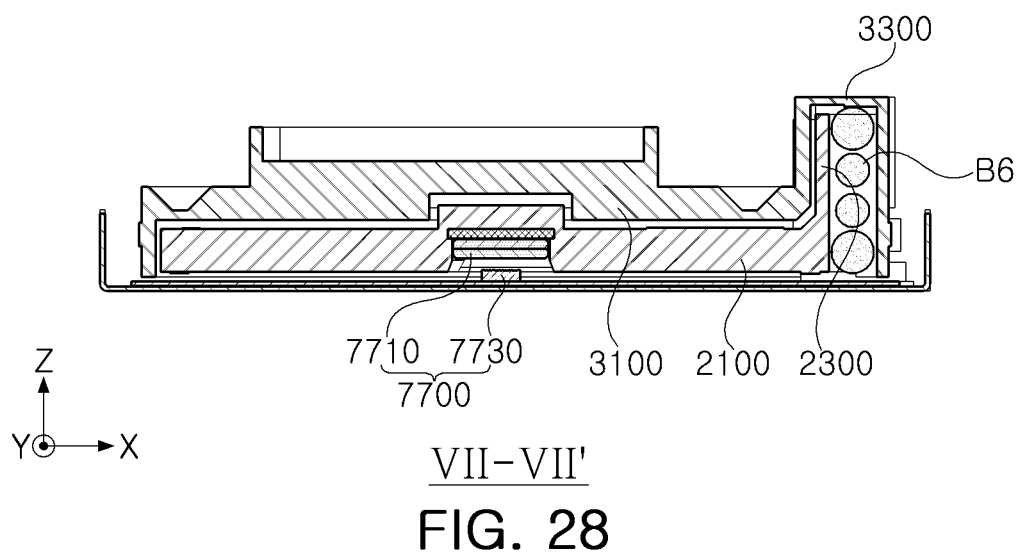
FIG. 28 is a cross-sectional view taken along line VII-VII' of FIG. 23.
Figure 29:
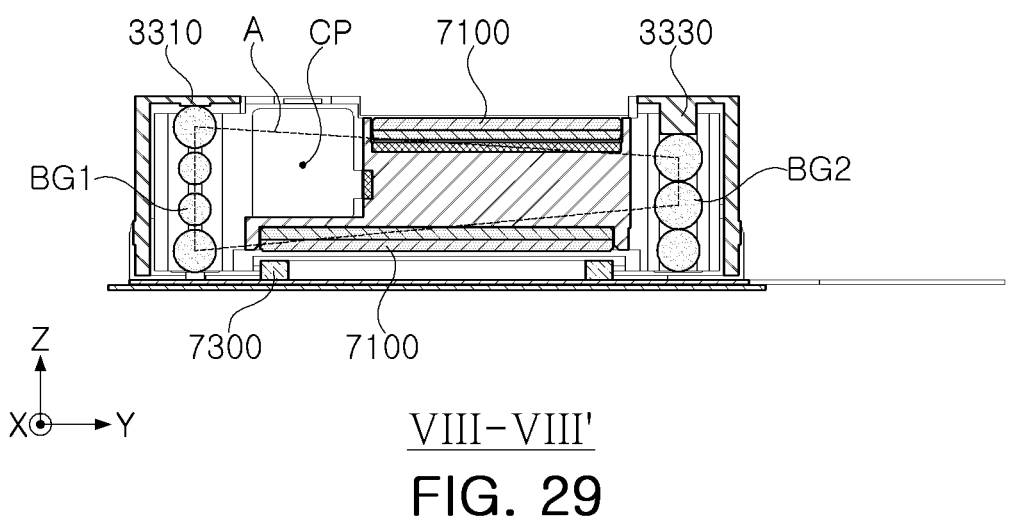
FIG. 29 is a cross-sectional view taken along line VIII-VIII' of FIG. 23.

FIG. 27 is a cross-sectional view taken along line VI-VI' of FIG. 23, FIG. 28 is a cross-sectional view taken along line VII-VII' of FIG. 23, and FIG. 29 is a cross-sectional view taken along line VIII-VIII' of FIG. 23.

Figure 30:
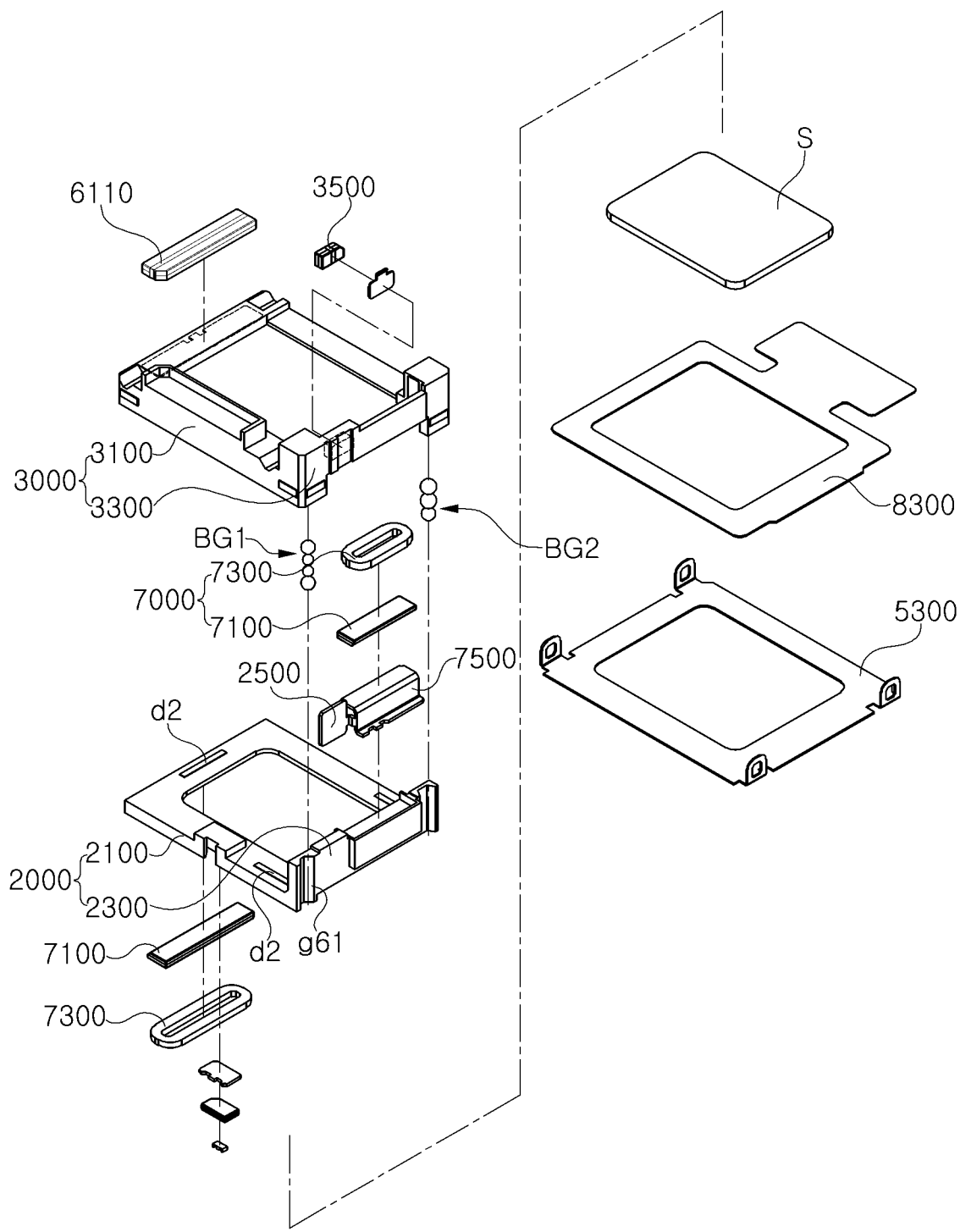
FIG. 30 is a modified example of a position of a third magnet.

FIG. 30 is a modified example of the position of the third magnet.

The movement of the carrier 2000 in the optical axis (Z-axis) direction will be described with reference to FIGS. 23 to 30.

The carrier 2000 includes a body portion 2100 and a guide portion 2300. The body portion 2100 may have a quadrangular frame shape. The guide portion 2300 is disposed on one side of the body portion 2100. For example, the guide portion 2300 extends in the optical axis (Z-axis) direction from one side of the body portion 2100.

The base 3000 includes a seating portion 3100 and a receiving portion 3300. The seating portion 3100 may have a quadrangular frame shape. The receiving portion 3300 is disposed on one side of the seating portion 3100. For example, the receiving portion 3300 extends in the optical axis (Z-axis) direction from one side of the seating portion 3100.

The body portion 2100 of the carrier 2000 is disposed on the seating portion 3100 of the base 3000. For example, with reference to FIG. 23, the carrier 2000 is disposed such that the upper surface of the body portion 2100 faces the lower surface of the seating portion 3100 of the base 3000.

The seating portion 3100 of the base 3000 may serve as a stopper limiting the movement range of the carrier 2000 when the carrier 2000 moves upwardly in the optical axis (Z-axis) direction.

A second cushioning member d2 having elasticity is disposed on at least one of the surfaces of the body portion 2100 of the carrier 2000 and the seating portion 3100 of the base 3000, facing each other in the optical axis (Z-axis) direction. For example, referring to FIG. 23, the second cushioning member d2 may be disposed on the upper surface of the body portion 2100 of the carrier 2000. The second cushioning members d2 may be disposed to be spaced apart from each other on at least three positions of the upper surface of the body portion 2100 of the carrier 2000. The second cushioning member d2 may be formed of a material having elastic properties. For example, the second cushioning member d2 may be formed of a rubber material.

Accordingly, in the case in which the carrier 2000 and the base 3000 collide, impact and noise may be reduced by the second cushioning member d2.

At least a portion of the guide portion 2300 of the carrier 2000 is accommodated in the receiving portion 3300 of the base 3000. To this end, the receiving portion 3300 of the base 3000 is provided with an accommodation space in which the guide portion 2300 of the carrier 2000 is disposed.

A third guide groove g6 is respectively provided in the guide portion 2300 of the carrier 2000 and the receiving portion 3300 of the base 3000, and the third ball member B6 is disposed in the third guide groove g6. The third guide groove g6 has a shape having a length in the optical axis (Z-axis) direction.

The third ball member B6 includes a plurality of balls disposed in the optical axis (Z-axis) direction. The plurality of balls may be rolled in the optical axis (Z-axis) direction when the carrier 2000 is moved in the optical axis (Z-axis) direction.

The third guide groove g6 includes a first groove g61, a second groove g62, a third groove g63, and a fourth groove g64. The guide portion 2300 of the carrier 2000 is provided with a first groove g61 and a second groove g62, and the receiving portion 3300 of the base 3000 is provided with a third groove g63 and a fourth groove g64. Each groove is formed to extend to have a length in the optical axis (Z-axis) direction.

The first groove g61 and the third groove g63 are disposed to face each other in a direction perpendicular to the optical axis (Z-axis) direction, and a portion (e.g., a first ball group BG1 to be described later) of a plurality of balls of the third ball member B6 is formed in a space between the first groove g61 and the third groove g63.

In addition, the second groove g62 and the fourth groove g64 are disposed to face each other in a direction perpendicular to the optical axis (Z-axis) direction, and the rest (e.g., a second ball group BG2 to be described later) of the plurality of balls of the third ball member B6 are disposed in a space between the second groove g62 and the fourth groove g64.

The first groove g61, the third groove g63, and the fourth groove g64 have an approximately 'V' shape in cross section cut in a plane perpendicular to the optical axis (Z-axis) direction, and the second groove g62 has an approximately '⌴' shape.

Accordingly, the first ball group BG1 of the third ball member B6 may be in two-point contact with the first groove g61 and may be in two-point contact with the third groove g63. Also, the second ball group BG2 of the third ball member B6 may contact the second groove g62 at one point and contact the fourth groove g64 at two points.

For example, the first ball group BG1 of the third ball member B6 may be in four-point contact with the opposing first groove g61 and third groove g63, and the second ball group BG2 of the third ball member B6 may be in three-point contact with the opposing second groove g62 and fourth groove g64.

When the carrier 2000 moves in the optical axis (Z-axis) direction, the first ball group BG1, the first groove g61, and the third groove g63 of the third ball member B6 may function as a main guide. In addition, the second ball group BG2, the second groove g62, and the fourth groove g64 of the third ball member B6 may function as an auxiliary guide.

A first magnetic body 2500 is disposed on the guide portion 2300 of the carrier 2000, and a second magnetic body 3500 is disposed on the receiving portion 3300 of the base 3000. When the guide portion 2300 of the carrier 2000 is disposed in the receiving portion 3300 of the base 3000, the first magnetic body 2500 and the second magnetic body 3500 face each other.

The first magnetic body 2500 and the second magnetic body 3500 may generate attractive force between each other. For example, attractive force acts between the first magnetic body 2500 and the second magnetic body 3500 in a direction perpendicular to the optical axis (Z-axis).

One of the first magnetic body 2500 and the second magnetic body 3500 may be a magnet, and the other may be a yoke. In another example, both the first magnetic body 2500 and the second magnetic body 3500 may be provided as magnets.

Due to the attractive force of the first magnetic body 2500 and the second magnetic body 3500, the third ball member B6 may be in contact with the carrier 2000 and the base 3000, respectively.

The third ball member B6 includes a first ball group BG1 and a second ball group BG2, and the first ball group BG1 and the second ball group BG2 each include a plurality of balls disposed in the optical axis (Z-axis) direction.

The first ball group BG1 and the second ball group BG2 are spaced apart from each other in a direction (e.g., Y-axis direction) perpendicular to the optical axis (Z-axis). The number of balls in the first ball group BG1 and the number of balls in the second ball group BG2 may be different from each other (refer to FIG. 23).

For example, the first ball group BG1 includes four or more balls disposed in the optical axis (Z-axis) direction, and the second ball group BG2 includes three or fewer balls disposed in the optical axis (Z-axis) direction.

However, the examples described herein are not limited to the number of balls belonging to each ball group, and under the premise that the number of balls belonging to the first ball group BG1 is different from the number of balls belonging to the second ball group BG2, the number of balls belonging to each ball group may be changed. Hereinafter, for convenience of description, an example in which the first ball group BG1 includes four balls and the second ball group BG2 includes three balls will be described.

Referring to FIG. 29, in the first ball group BG1, two balls disposed at the outermost in the optical axis (Z-axis) direction have the same diameter, and a diameter of a ball disposed therebetween may be less than a diameter of the ball disposed at the outermost side. For example, in the first ball group BG1, two balls disposed at the outermost sides in the optical axis (Z-axis) direction have a first diameter, and two balls disposed therebetween have a second diameter, and the first diameter is greater than the second diameter.

In addition, two of the three balls of the second ball group BG2 have a greater diameter than that of the remaining one ball. For example, in the second ball group BG2, two balls have a third diameter, one ball has a fourth diameter, and the third diameter is greater than the fourth diameter. Also, the first diameter and the third diameter may be the same.

Referring to FIG. 29, among the three balls of the second ball group BG2, two balls disposed in the upper side in the optical axis (Z-axis) direction have a third diameter, and one ball disposed at the bottom side in the optical axis (Z-axis) direction has a fourth diameter. As another example, one ball disposed on the uppermost side in the optical axis (Z-axis) direction may have a fourth diameter, and the other two balls may have a third diameter. In addition, among the three balls of the second ball group BG2, two balls disposed at the outermost in the optical axis (Z-axis) direction may have a third diameter, and one ball disposed therebetween may have a fourth diameter.

In this case, the same diameter may mean not only physically the same, but also including manufacturing errors.

Accordingly, the third ball member B6 may be in at least three-point contact with the carrier 2000 and the base 3000.

On the other hand, a distance between the centers of the two balls having the first diameter, among the plurality of balls of the first ball group BG1, and a distance between the centers of the two balls having the third diameter, among the plurality of balls of the second ball group BG2, is different. For example, a distance between the centers of two balls having a first diameter is greater than a distance between the centers of two balls having a third diameter.

When the carrier 2000 is moved in the optical axis (Z-axis) direction, in order for the carrier 2000 to move parallel to the optical axis (Z-axis) direction, for example, to prevent a tilt from occurring, a center point CP of the attractive force acting between the first magnetic body 2500 and the second magnetic body 3500 should be located within a support area A connecting contact points of the carrier 2000 (or the base 3000) and the third ball member B6.

When the center point CP of action of the attractive force deviates from the support area A, the position of the carrier 2000 is shifted in the course of the movement of the carrier 2000, and there is a fear that a tilt may occur. Therefore, it is necessary to form the support area A as wide as possible.

In this example, intentionally, the size (e.g., a diameter) of a portion of the plurality of balls of the third ball member B6 is formed to be larger than the size (e.g., a diameter) of the remaining balls. In this case, balls having a relatively large size among the plurality of balls may be intentionally brought into contact with the carrier 2000 or the base 3000.

Referring to FIG. 29, among the plurality of balls of the first ball group BG1, the diameters of the two balls disposed at the outermost side in the optical axis (Z-axis) direction are greater than the diameters of the remaining balls, and thus, the first ball group BG1 is in two-point contact with the carrier 2000, or the base 3000. In addition, since the diameters of two balls among the plurality of balls of the second ball group BG2 are greater than the diameters of the remaining balls, the second ball group BG2 is in two-point contact with the carrier 2000 or the base 3000.

Accordingly, the third ball member B6 including the first ball group BG1 and the second ball group BG2 is four-point contact with the carrier 2000 or the base 3000. In addition, the support area A connecting the contact points to each other may have a quadrangular shape (e.g., a trapezoidal shape).

Therefore, the support area A may be formed relatively wide, and thus the center point CP of the attractive force acting between the first magnetic body 2500 and the second magnetic body 3500 may be stably disposed in the support area A. Therefore, driving stability at the time of focus adjustment may be ensured.

On the other hand, even if some balls are manufactured to have the same diameter, actual sizes of the balls may be different due to manufacturing errors. For example, one of the first ball group BG1 and the second ball group BG2 is in two-point contact with the carrier 2000 or the base 3000, and the other may be in one-point contact with the carrier 2000 or the base 3000. In this case, the support area A connecting the contact points may have a triangular shape unlike in FIG. 29.

The first magnetic body 2500 and the second magnetic body 3500 may be disposed closer to a main guide, for example, the first groove g61 and the third groove g63 than an auxiliary guide, for example, the second groove g62 and the fourth groove g64, respectively. For example, when viewed in the first axis (X-axis) direction, the center point CP of action of the attractive force generated between the first magnetic body 2500 and the second magnetic body 3500 is disposed closer to the main guide than the auxiliary guide.

Since the support area A has a longer length in the optical axis (Z-axis) direction as it is closer to the main guide, by disposing the first magnetic body 2500 and the second magnetic body 3500 closer to the main guide, the center point CP of action of the attractive force may be located within the support area A.

On the other hand, during focus adjustment, the plurality of balls of the first ball group BG1 and the plurality of balls of the second ball group BG2 roll in the optical axis (Z-axis) direction. Accordingly, the size of the support area A may be changed according to the movement of the balls belonging to each ball group. In this case, there is a fear that the center point CP of the attractive force unexpectedly deviates from the support area A during driving.

In this example, a first protrusion 3310 and a second protrusion 3330 protruding toward the third ball member B6 may be disposed in the receiving portion 3300 of the base 3000. For example, the first protrusion 3310 is disposed in the third groove g63 as the main guide, and the second protrusion 3330 is disposed in the fourth groove g64 as the auxiliary guide.

In this case, the first protrusion 3310 and the second protrusion 3330 have different lengths in the optical axis (Z-axis) direction. For example, the length of the second protrusion 3330 in the optical axis (Z-axis) direction is longer than the length of the first protrusion 3310 in the optical axis (Z-axis) direction.

In addition, the length of the third groove g63 serving as the main guide in the optical axis (Z-axis) direction is different from the length of the fourth groove g64 serving as the auxiliary guide in the optical axis (Z-axis) direction. For example, the length of the third groove g63 in the optical axis (Z-axis) direction is greater than the length of the fourth groove g64 in the optical axis (Z-axis) direction.

Accordingly, in this example, the number of the plurality of balls belonging to the first ball group BG1 and the number of the plurality of balls belonging to the second ball group BG2 are configured differently, while the lengths of the spaces in which respective ball groups are accommodated in the optical axis (Z-axis) direction are formed differently. Therefore, the size of the support area A is prevented from being changed, or even in a case in which the size of the support area A is changed, the center point CP of action of the attractive force may be prevented from deviating from the support area A.

Referring to FIG. 23, the actuator 2 according to this example includes a second driving unit 7000. The second driving unit 7000 may generate driving force in the optical axis (Z-axis) direction to move the carrier 2000 in the optical axis (Z-axis) direction.

The second driving unit 7000 includes a third magnet 7100 and a third coil 7300. The third magnet 7100 and the third coil 7300 may be disposed to face each other in the optical axis (Z-axis) direction.

The third magnet 7100 is disposed on the carrier 2000. For example, the third magnet 7100 may be disposed on at least one of an upper surface and a lower surface of the carrier 2000. The third magnet 7100 may be disposed on at least one of an upper surface and a lower surface of the guide portion 2300 of the carrier 2000. The upper surface of the carrier 2000 may be a surface facing the upper surface of the housing 5000, and the lower surface of the carrier 2000 may refer to a surface facing the cover 5300.

A third back yoke 7500 may be disposed between the carrier 2000 and the third magnet 7100. The third back yoke 7500 may improve the driving force by preventing the magnetic flux of the third magnet 7100 from leaking.

Referring to FIG. 23, the third magnet 7100 includes two magnets, and one magnet may be respectively disposed on the upper surface and the lower surface of the carrier 2000. In addition, the third coil 7300 includes two coils to face two magnets in the optical axis (Z-axis) direction.

Since the third magnet 7100 and the third coil 7300 face in the optical axis (Z-axis) direction, as the third magnet 7100 moves in the optical axis (Z-axis) direction, a separation distance between the third magnet 7100 and the third coil 7300 in the optical axis (Z-axis) direction may be changed.

In this example, when a separation distance between the third magnet 7100 and the third coil 7300 disposed on the upper surface side of the carrier 2000 is reduced, a separation distance between the third magnet 7100 and the third coil 7300 disposed on the lower surface side of the carrier 2000 increases.

Therefore, since the separation distance between the third magnet 7100 and the third coil 7300 may be compensated, the change in the magnitude of the driving force of the third driving unit 7000 according to the movement of the carrier 2000 may be prevented.

However, the third magnet 7100 may also be disposed on one of the upper surface and the lower surface of the carrier 2000 according to the moving distance of the carrier 2000 required for focus adjustment.

The third magnet 7100 may be a single-pole magnet magnetized such that the N pole and the S pole are disposed in the optical axis (Z-axis) direction. For example, a surface of the third magnet 7100, facing the third coil 7300, may have an S pole, and an opposite surface thereto may have an N pole. In this case, the N pole and the S pole may be magnetized opposite to each other. A neutral region is formed between the N and S poles.

The third coil 7300 is disposed to face the third magnet 7100. For example, the third coil 7300 may be disposed to face the third magnet 7100 in the optical axis (Z-axis) direction.

When the third coil 7300 includes two coils, one coil is disposed on the first substrate 8100, and the other coil is disposed on a second substrate 8300. The second substrate 8300 is mounted on the cover 5300 such that the third magnet 7100 and the third coil 7300 face each other in the optical axis (Z-axis) direction.

The third magnet 7100 is a moving member that is mounted on the carrier 2000 and moves in the optical axis (Z-axis) direction together with the carrier 2000, and the third coil 7300 is a fixing member fixed to the first substrate 8100 and/or the second substrate 8300.

When power is applied to the third coil 7300, the carrier 2000 may be moved in the optical axis (Z-axis) direction by the electromagnetic force between the third magnet 7100 and the third coil 7300.

Since the image sensor S is disposed on the carrier 2000, the image sensor S is also moved in the optical axis (Z-axis) direction by the movement of the carrier 2000.

FIG. 30 is a modified example of the position of the third magnet 7100. The example illustrated in FIG. 30 is different from the example illustrated in FIG. 23 in the positions of the third magnet 7100 and the third coil 7300.

Referring to FIG. 30, one of the two magnets included in the third magnet 7100 may be disposed on a remaining portion of the lower surface of the carrier 2000, excluding a portion where the guide portion 2300 is disposed.

Referring to FIGS. 23 and 30, the third magnet 7100 may be disposed anywhere on the lower surface of the carrier 2000.

Since the third magnet 7100 may be disposed anywhere on the lower surface of the carrier 2000, at least a portion of the third magnet 7100 may be disposed to overlap the first magnet 6110 or the second magnet 6310 depending on the position of the third magnet 7100 in the optical axis (Z-axis) direction.

In the example illustrated in FIG. 30, the first magnet 6110 is disposed on a position overlapping the third magnet 7100 in the optical axis (Z-axis) direction.

In this case, since the magnetic field of the first magnet 6110 may affect the third coil 7300 or the magnetic field of the third magnet 7100 may affect the first coil 6130, a yoke may be disposed between the first magnet 6110 and the third magnet 7100. The yoke may be disposed on at least one of an upper surface of the carrier 2000, a lower surface of the carrier 2000, and a lower surface of the base 3000. The yoke may be formed of a magnetic metal material.

The actuator 2 according to this example may sense the position of the carrier 2000 in the optical axis (Z-axis) direction.

To this end, a second position sensing unit 7700 is provided (see FIGS. 23 and 28). The second position sensing unit 7700 includes a sensing magnet 7710 and a third position sensor 7730. The sensing magnet 7710 is disposed on the lower surface of the carrier 2000, and the third position sensor 7730 is disposed on the second substrate 8300 to face the sensing magnet 7710. The third position sensor 7730 may be a Hall sensor.

In the example illustrated in FIG. 23, the second position sensing unit 7700 includes the sensing magnet 7710 and the third position sensor 7730, but without disposing a separate sensing magnet 7710, the third position sensor 7730 may also be disposed to face the third magnet 7100.

Alternatively, the second position sensing unit 7700 may include the sensing magnet 7710 and a sensing coil. For example, the sensing coil may be disposed on the second substrate 8300 to face the sensing magnet 7710. The inductance of the sensing coil changes according to a change in the distance between the sensing magnet 7710 and the sensing coil in the optical axis (Z-axis) direction, and thereby, the position of the carrier 2000 may be detected.

Alternatively, instead of disposing a separate sensing magnet and a sensing coil, the third coil 7300 may function as the second position sensing unit 7700.

For example, the position of the carrier 2000 may be sensed through a change in inductance of the third coil 7300.

For example, as the carrier 2000 moves, the third magnet 7100 also moves, and accordingly, the inductance of the third coil 7300 changes. Accordingly, the position of the carrier 2000 may be sensed through the change in inductance of the third coil 7300.

The cover 5300 is coupled to the housing 5000 to cover at least a portion of the lower surface of the carrier 2000.

Accordingly, the cover 5300 may serve as a stopper that prevents the carrier 2000 from being separated to the outside thereof.

In addition, the cover 5300 may cover the lower surface of the guide portion 2300 of the carrier 2000 to prevent the third ball member B6 from being separated.

A third cushioning member d3 having elasticity may be disposed on at least one of surfaces of the body portion 2100 of the carrier 2000 and the cover 5300 (or the second substrate 8300), facing each other in the optical axis (Z-axis) direction. For example, referring to FIG. 26, the third cushioning member d3 may be disposed on the lower surface of the body portion 2100 of the carrier 2000. The third cushioning members d3 may be disposed to be spaced apart from each other in at least three places among the lower surfaces of the body portion 2100 of the carrier 2000. The third cushioning member d3 may be formed of a material having elastic properties. For example, the third cushioning member d3 may be formed of a rubber material.

Accordingly, when the carrier 2000 and the cover 5300 (or the second substrate 8300) collide, impact and noise may be reduced by the third cushioning member d3.

The carrier 2000 may be moved in the optical axis (Z-axis) direction relative to the base 3000. Also, the carrier 2000 may be moved in a direction perpendicular to the optical axis (Z-axis), together with the base 3000.

The image sensor S is electrically connected to the first substrate 8100 and/or the second substrate 8300. For example, the image sensor S may be electrically connected to the first substrate 8100 and/or the second substrate 8300 by a connection portion.

Since the image sensor S is movable in three axial directions, the connection portion connecting the image sensor S and the first substrate 8100 and/or the second substrate 8300 may be configured to be flexible.

For example, the connection portion may be in the form of a flexible film in which a conductor is patterned or in the form of a plurality of cables. Accordingly, when the image sensor S is moved, the connection portion may be bent.

In another example, a third substrate connected to the image sensor S may be provided. The third substrate has a flexible connection portion, through which the image sensor S and the third substrate may be connected. The connection portion may be in the form of a flexible film in which conductors are patterned or in the form of a plurality of cables.

Referring to FIGS. 14 to 30, the camera module 30 may perform autofocusing (AF) and optical image stabilization (OIS) by moving the image sensor S instead of the lens module 1000. For example, the image sensor S may be moved together with the carrier 2000 in the optical axis (Z-axis) direction to adjust the focus. In addition, the image sensor S may be moved in a direction perpendicular to the optical axis (Z-axis) together with the carrier 2000 to correct camera shake during photographing.

Figure 31:
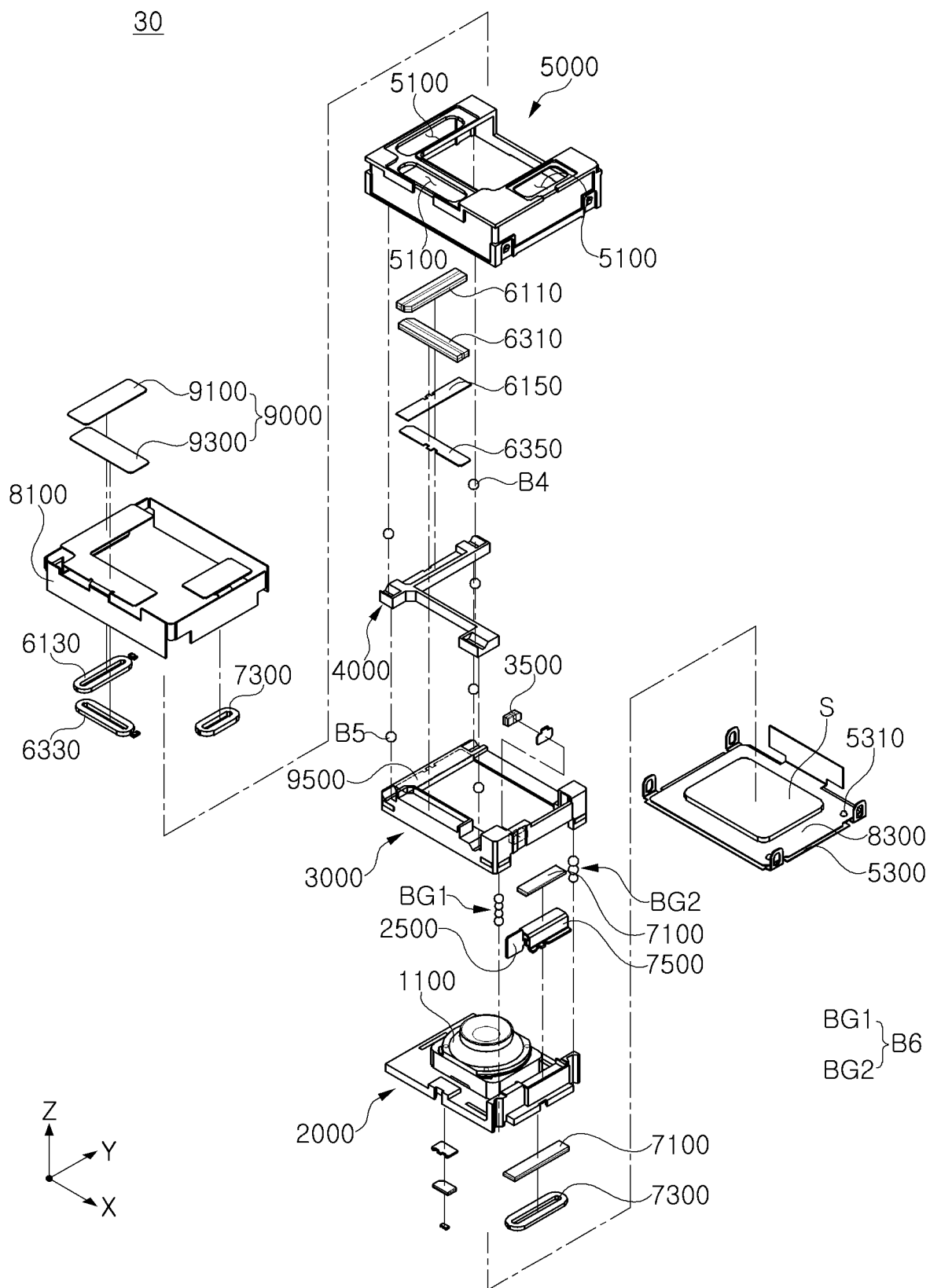
FIG. 31 is a modified example of the positions of a lens barrel and an image sensor.

As another example, referring to FIG. 31, the lens barrel 1100 may be coupled to the carrier 2000. Accordingly, the lens barrel 1100 may be moved in the optical axis (Z-axis) direction together with the carrier 2000 to adjust the focus. In addition, the lens barrel 1100 may be moved in a direction perpendicular to the optical axis (Z-axis) together with the carrier 2000 to correct camera shake during photography.

The image sensor S is disposed on the second substrate 8300, and the second substrate 8300 is mounted on the cover 5300. Then, the cover 5300 is coupled to the housing 5000. In this case, the image sensor S is a fixed member that does not move during autofocusing (AF) and optical image stabilization (OIS).

The cover 5300 is provided with a protrusion 5310 protruding in the optical axis (Z-axis) direction, and the protrusion 5310 may be disposed in a position facing the third ball member B3 in the optical axis (Z-axis) direction. Accordingly, the third ball member B6 may be prevented from being separated, by the protrusion 5310. For reference, a hole through which the protrusion 5310 passes may be disposed in the second substrate 8300.

Figure 32:
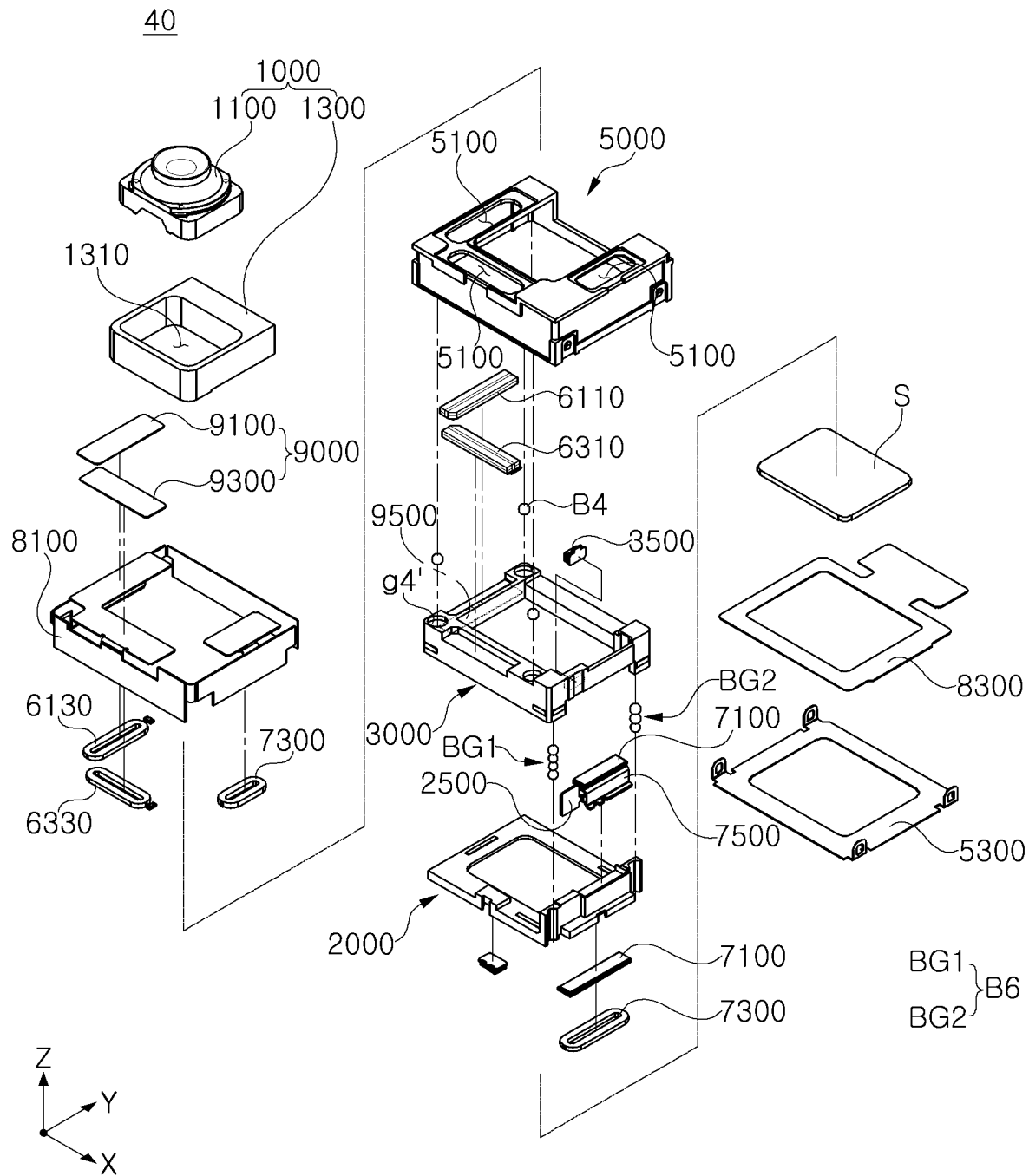
FIG. 32 is a schematic exploded perspective view of a camera module according to another example.
Figure 33:
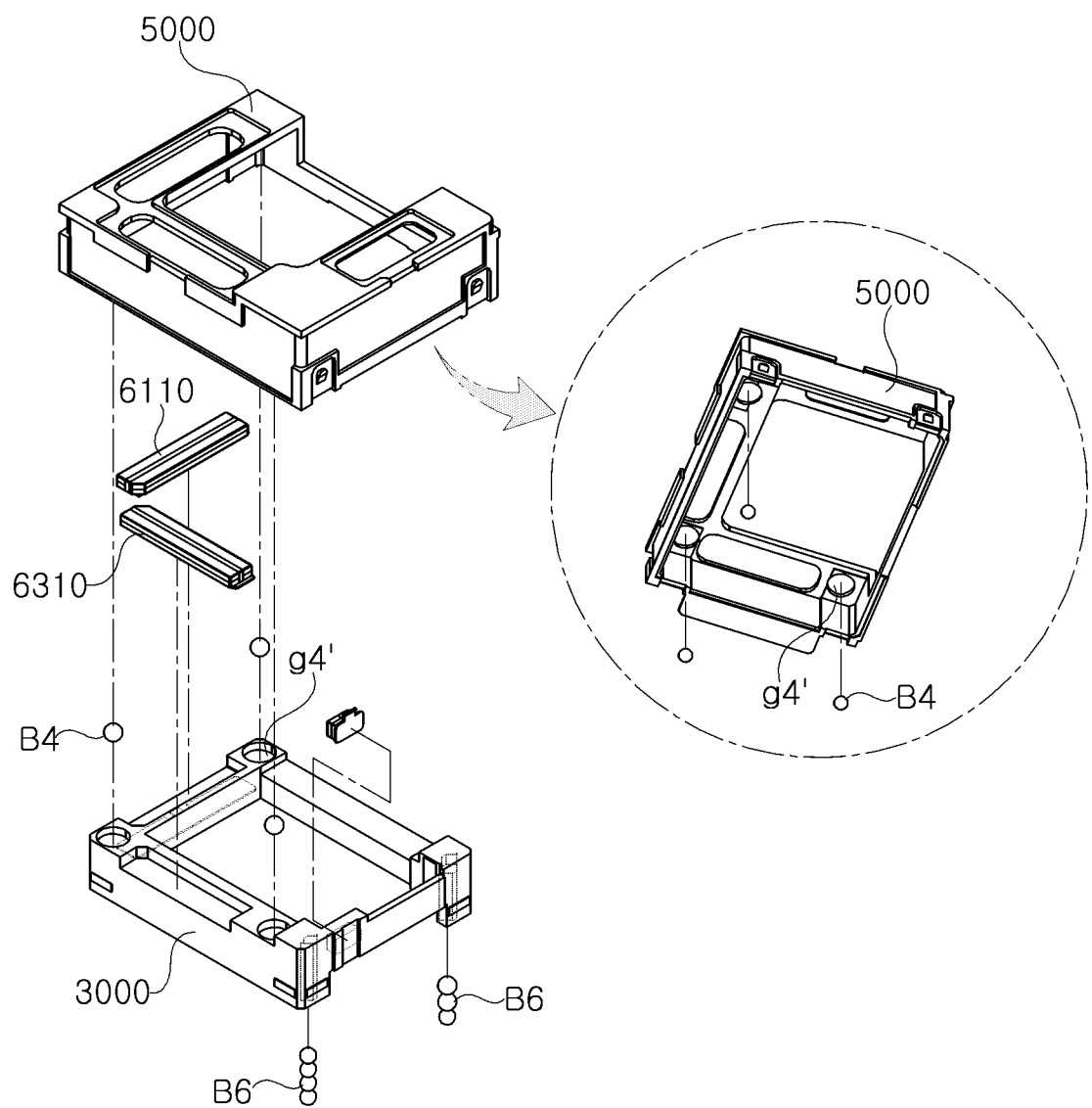
FIG. 33 is an exploded perspective view of a housing and a base of a camera module according to another example.

FIG. 32 is a schematic exploded perspective view of a camera module according to another example, and FIG. 33 is an exploded perspective view of a housing and a base of the camera module according to another example.

An actuator 3 and a camera module 40 illustrated in FIGS. 32 and 33 have a difference in configuration for guiding the movement of the base 3000, compared to the example illustrated in FIGS. 14 to 30.

Referring to FIGS. 32 and 33, the base 3000 is disposed in the housing 5000. Unlike the example illustrated in FIGS. 17 to 30, the guide member 4000 is not provided between the housing 5000 and the base 3000. In addition, as the guide member 4000 is not provided, the ball member (the first ball member in the example illustrated in FIGS. 17 to 30) disposed between the guide member 4000 and the housing 5000 is also not provided.

The base 3000 may be configured to be movable in the first axis (X-axis) direction and the second axis (Y-axis) direction within the housing 5000.

The first ball member B4 is disposed between the housing 5000 and the base 3000. The first ball member B4 is disposed to contact the housing 5000 and the base 3000, respectively.

The first ball member B4 serves to guide the base 3000 to move in two axial directions during the camera shake compensation process, and in addition, also functions to maintain a gap between the housing 5000 and the base 3000.

The first ball member B4 may guide both the movement of the base 3000 in the first axis (X-axis) direction and the movement of the base 3000 in the second axis (Y-axis) direction.

For example, when the driving force in the first axis (X-axis) direction is generated, the first ball member B4 rolls in the first axis (X-axis) direction. Accordingly, the first ball member B4 guides the movement of the base 3000 in the first axis (X-axis) direction.

In addition, when the driving force in the second axis (Y-axis) direction is generated, the first ball member B4 rolls in the second axis (Y-axis) direction. Accordingly, the first ball member B4 guides the movement of the base 3000 in the second axis (Y-axis) direction.

The first ball member B4 includes a plurality of balls disposed between the housing 5000 and the base 3000.

A first guide groove g4' in which the first ball member B4 is disposed is provided in at least one of surfaces of the housing 5000 and the base 3000, facing each other, in the optical axis (Z-axis) direction. The first guide groove g4' is provided as a plurality of first guide grooves g4' to correspond to the plurality of balls of the first ball member B4.

The first ball member B4 is disposed in the first guide groove g4' and fitted between the housing 5000 and the base 3000. In the state accommodated in the first guide groove g4', the first ball member B4 may be limited in the movement in the optical axis (Z-axis) direction, and may move in the first axis (X-axis) direction and the second axis (Y-axis) direction. For example, the first ball member B1 is capable of rolling motion in the first axis (X-axis) direction and the second axis (Y-axis) direction.

The first guide groove g4' may be configured to have a circular cross-sectional shape cut in a plane perpendicular to the optical axis (Z-axis) direction.

The first magnet 6110 and the second magnet 6310 of the first driving unit 6000 are mounted on the base 3000.

In the example illustrated in FIGS. 32 and 33, unlike the example illustrated in FIGS. 17 to 30, the guide member 4000 is not disposed between the housing 5000 and the base 3000, and thus, the height of the actuator 3 and the camera module 40 may be further reduced.

Figure 34:
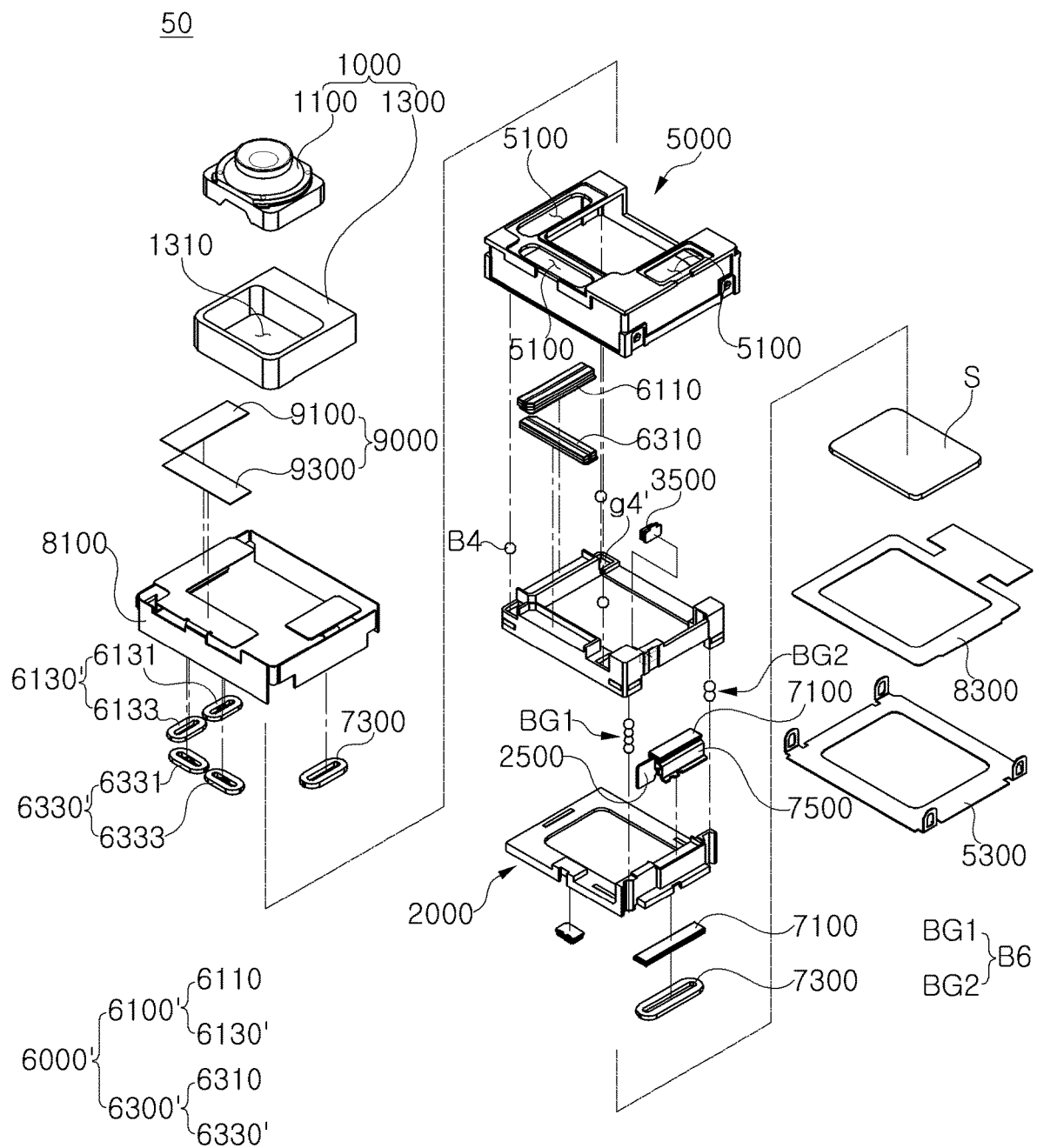
FIG. 34 is a schematic exploded perspective view of a camera module according to another example.
Figure 35:
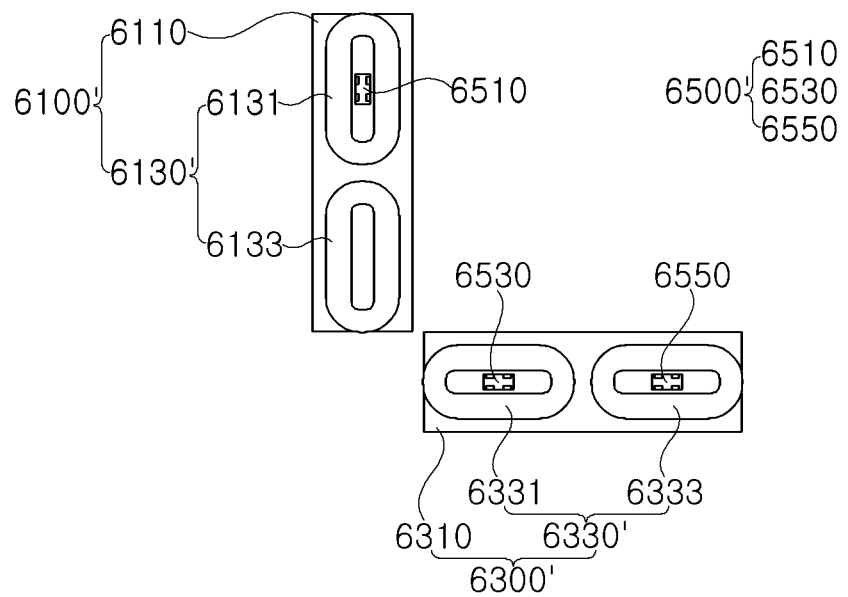
FIG. 35 is a plan view of a first driving unit of a camera module according to another example.
Figure 36:
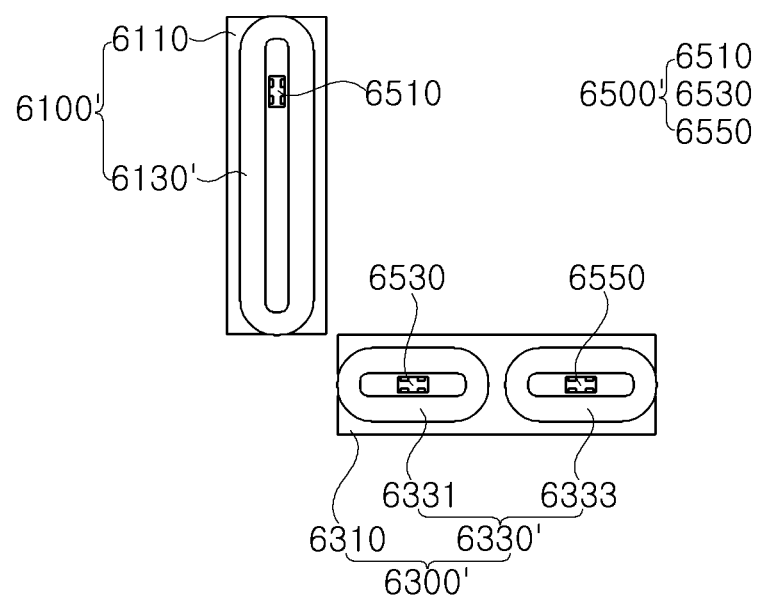
FIGS. 36 and 37 are modified examples of FIG. 35.
Figure 37:
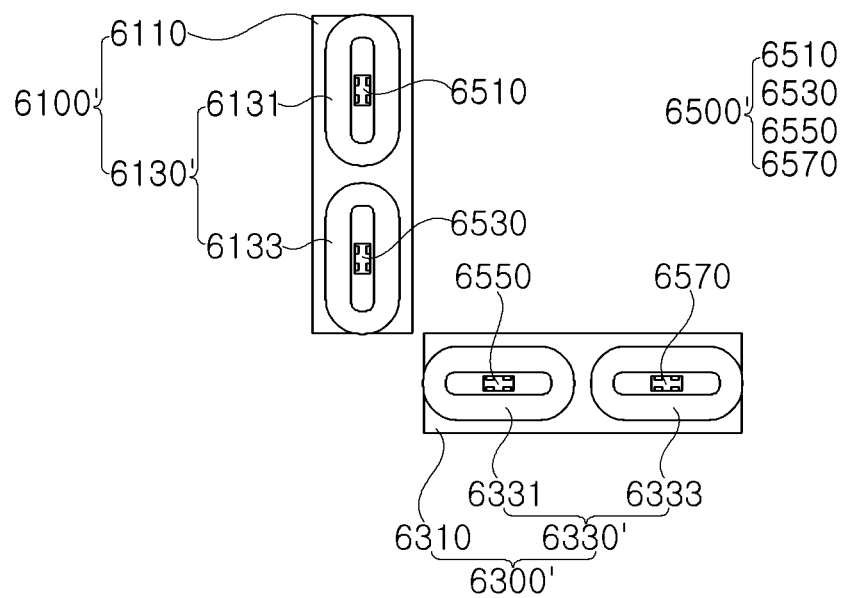

FIG. 34 is a schematic exploded perspective view of a camera module according to another example, FIG. 35 is a plan view of a first driving unit of the camera module according to another example, and FIGS. 36 and 37 illustrate modified examples of FIG. 35.

An actuator 4 and a camera module 50 illustrated in FIGS. 34 to 36 are different from the example illustrated in FIGS. 32 and 33 in a configuration of a first driving unit 6000'.

Referring first to the example illustrated in FIGS. 32 and 33, the first driving unit 6000 includes a first sub-driving unit 6100 and a second sub-driving unit 6300. The first sub-driving unit 6100 includes a first magnet 6110 and a first coil 6130, and the second sub-driving unit 6300 includes a second magnet 6310 and a second coil 6330.

In addition, the first guide groove g4' in which the first ball member B4 is disposed is configured to have a circular cross-sectional shape cut in a plane perpendicular to the optical axis (Z-axis) direction. The first ball member B4 may roll in a direction perpendicular to the optical axis (Z-axis) direction within the first guide groove g4'.

Therefore, in the case of occurrence of an unintentional deviation in the driving force in the process of generating the driving force in the first axis (X-axis) direction or the second axis (Y-axis) direction, there is a possibility that rotational force having the optical axis (Z-axis) as the rotation axis acts on the base 3000.

In the case of the example illustrated in FIGS. 32 and 33, it may be difficult to prevent generation of such a rotational force or to generate driving force capable of offsetting the rotational force.

However, in the case of the example illustrated in FIGS. 34 to 36, the first driving unit 6000' is configured to additionally generate driving force that offsets the rotational force.

Referring to FIGS. 34 to 36, the first driving unit 6000' includes a first sub-driving unit 6100' and a second sub-driving unit 6300'. The first sub-driving unit 6100' may include a first magnet 6110 and a first coil unit 6130', and the second sub-driving unit 6300' may include a second magnet 6310 and a second coil unit 6330'.

At least one of the first coil unit 6130' and the second coil unit 6330' may include two coils.

For example, the first coil unit 6130' may include a first sub-coil 6131 and a second sub-coil 6133, and the second coil unit 6330' may include a third sub-coil 6331 and a fourth sub-coil 4.

The first sub-coil 6131 and the second sub-coil 6133 are disposed to face the first magnet 6110 in the optical axis (Z-axis) direction, respectively. In addition, the first sub-coil 6131 and the second sub-coil 6133 are spaced apart from each other in the longitudinal direction of the first magnet 6110.

The third sub-coil 6331 and the fourth sub-coil 6333 are disposed to face the second magnet 6310 in the optical axis (Z-axis) direction, respectively. In addition, the third sub-coil 6331 and the fourth sub-coil 6333 are spaced apart from each other in the longitudinal direction of the second magnet 6310.

FIGS. 34 and 35 illustrate an example in which the first coil unit 6130' and the second coil unit 6330' each include two coils, but as illustrated in FIG. 36, one of the first coil unit 6130' and the second coil unit 6330' may include two coils and the other may include one coil.

The first position sensing unit 6500' includes at least three position sensors. When three position sensors are provided, one position sensor is disposed to face one of the first magnet 6110 and the second magnet 6310, and the other two position sensors are disposed to face the other of the first magnet 6110 and the second magnet 6310.

For example, referring to FIG. 35, the first position sensing unit 6500' includes a first position sensor 6510, a second position sensor 6530, and a third position sensor 6550.

The first position sensor 6510 is disposed to face the first magnet 6110 in the optical axis (Z-axis) direction, and the second position sensor 6530 and the third position sensor 6550 are disposed to face the second magnet 6310, respectively, in the optical axis (Z-axis) direction. The second position sensor 6530 and the third position sensor 6550 may be spaced apart from each other in the longitudinal direction of the second magnet 6310.

When the base 3000 is rotated by a rotational force having the optical axis (Z-axis) as the rotation axis, the second magnet 6310 disposed on the base 3000 is also rotated together with the base 3000. Since the second magnet 6310 faces the second position sensor 6530 and the third position sensor 6550 that are spaced apart from each other, whether the base 3000 is rotated or not is determined through the second position sensor 6530 and the third position sensor 6550. In addition, the position of the rotated base 3000 may be detected.

Referring to FIG. 35, the first sub-driving unit 6100' includes two coils, and the second sub-driving unit 6300' includes two coils. Accordingly, the two coils and the first magnet 6110 of the first sub-driving unit 6100', and the two coils and the second magnet 6310 of the second sub-driving unit 6300' interact to generate driving force cancelling the rotational force.

Referring to FIG. 37, the first sub-driving unit 6100' may include two coils, the second sub-driving unit 6300' may include two coils, and the first position sensing unit 6500' may include four position sensors.

For example, the first position sensing unit 6500' includes a first position sensor 6510, a second position sensor 6530, a third position sensor 6550, and a fourth position sensor 6570.

The first position sensor 6510 and the second position sensor 6530 are disposed to face the first magnet 6110 in the optical axis (Z-axis) direction, and the third position sensor 6550 and the fourth position sensor 6570 are disposed to face the second magnet 6310 in the optical axis (Z-axis) direction, respectively. The first position sensor 6510 and the second position sensor 6530 may be spaced apart in the longitudinal direction of the first magnet 6110, and the third position sensor 6550 and the fourth position sensor 6570 may be spaced apart from each other in the longitudinal direction of the second magnet 6310.

Whether the base 3000 is rotated may be detected and the position of the rotated base 3000 may be sensed, through four position sensors, and the rotational force acting on the base 3000 may be offset through the first sub-driving unit 6100' and the second sub-driving unit 6300'.

As set forth above, an actuator for a camera and a camera module including the same according to one or more examples may improve optical image stabilization.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a carrier, a guide member, and a base disposed in the housing;
a first driving unit configured to generate driving force in a first axial direction, perpendicular to an optical axis direction, and in a second axial direction, perpendicular to both the optical axis direction and the first axial direction, the first driving unit comprising a plurality of magnets and a plurality of coils;
a first ball member disposed below the guide member in the optical axis direction, and
a second ball member disposed above the guide member in the optical axis direction,
wherein a groove is formed in the guide member, and the groove penetrates through the guide member in the optical axis direction, and
wherein at least one magnet among the plurality of magnets is accommodated in the groove.

2. The camera module of claim 1, wherein the base and the guide member are configured to be movable together in the first axial direction, and
the base is configured to be movable in the second axial direction relative to the guide member.

3. The camera module of claim 1, wherein the first driving unit comprises:
a first sub-driving unit comprising a first magnet disposed on the base and a first coil facing the first magnet; and
a second sub-driving unit comprising a second magnet disposed on the base and a second coil facing the second magnet.

4. The camera module of claim 3, wherein one or both of the first magnet and the second magnet are accommodated in the groove.

5. The camera module of claim 3, wherein the housing comprises a first substrate mounted thereon,
wherein the first coil and the second coil are disposed on the first substrate.

6. The camera module of claim 3, wherein a first yoke is disposed in a position facing the first magnet, and a second yoke is disposed in a position facing the second magnet.

7. The camera module of claim 1, wherein the first ball member and the second ball member roll in directions perpendicular to each other.

8. The camera module of claim 1, wherein the first ball member comprises a plurality of balls, and the groove is located between two of the plurality of balls.

9. The camera module of claim 1, further comprising a second driving unit configured to generate driving force in the optical axis direction, the second driving unit comprising a third magnet disposed on the carrier and a third coil facing the third magnet.

10. The camera module of claim 1, wherein the carrier comprises a body portion and a guide portion extending from one side of the body portion in the optical axis direction, and
a third ball member is disposed on the guide portion.

11. The camera module of claim 10, wherein the third ball member comprises a first ball group and a second ball group spaced apart in a direction perpendicular to the optical axis direction,
the first ball group comprises a plurality of balls arranged along the optical axis direction, and
among the plurality of balls, two balls disposed on the outermost side in the optical axis direction have the largest diameter.

12. The camera module of claim 11, wherein the number of balls included in the first ball group is greater than the number of balls included in the second ball group.

13. The camera module of claim 1, wherein an image sensor is disposed to be movable with the base.

14. The camera module of claim 1, further comprising a cover disposed to cover at least a portion of the carrier in the optical axis direction.

15. The camera module of claim 14, wherein a cushioning member having elasticity is disposed on at least one of a surface of the cover and a surface of the carrier, and
the surface of the cover and the surface of the carrier face each other.

16. The camera module of claim 1, wherein the guide member has an ']' or '[' shape when viewed in the optical axis direction.

17. The camera module of claim 1, wherein a reinforcing plate is disposed inside the guide member.

18. The camera module of claim 17, wherein the reinforcing plate is formed of a non-magnetic metal.

* * * * *